US012658521B2

(12) United States Patent (10) Patent No.: US 12,658,521 B2
Kim et al. (45) Date of Patent: Jun. 16, 2026

(54) BATTERY MODULE

(71) Applicant: SK On Co., Ltd., Seoul (KR)

(72) Inventors: Dong Min Kim, Daejeon (KR); Won Kyeong Kim, Daejeon (KR); Seung Dong Lee, Daejeon (KR); Ung Ho Lee, Daejeon (KR)

(73) Assignee: SK On Co., Ltd., Seoul (KR)

( * ) Notice: Subject to any disclaimer, the term of this patent is extended or adjusted under 35 U.S.C. 154(b) by 548 days.

(21) Appl. No.: 17/895,146

(22) Filed: Aug. 25, 2022

(65) Prior Publication Data

US 2023/0170576 A1     Jun. 1, 2023

(30) Foreign Application Priority Data

Sep. 16, 2021     (KR) ........................ 10-2021-0124168

(51) Int. Cl.
| | |
|---|---|
| H01M 10/00 | (2006.01) |
| H01M 50/117 | (2021.01) |
| H01M 50/211 | (2021.01) |
| H01M 50/325 | (2021.01) |
| H01M 50/505 | (2021.01) |

(52) U.S. Cl.
CPC ....... H01M 50/325 (2021.01); H01M 50/117 (2021.01); H01M 50/211 (2021.01); H01M 50/505 (2021.01)

(58) Field of Classification Search
CPC ............. H01M 50/325; H01M 50/117; H01M 50/211; H01M 50/505; H01M 50/502–512
See application file for complete search history.

(56) References Cited

U.S. PATENT DOCUMENTS

| | | | |
|---|---|---|---|
| 11,870,094 B2 | 1/2024 | Shin et al. | |
| 2010/0159320 A1* | 6/2010 | Kim ..................... | H01M 50/636 |
| | | | 429/178 |

(Continued)

FOREIGN PATENT DOCUMENTS

| | | | |
|---|---|---|---|
| CN | 211743260 U | 10/2020 | |
| EP | 2738835 A1 * | 6/2014 | .......... H01M 2/0245 |

(Continued)

OTHER PUBLICATIONS

European Patent Office, Appl. 22192528.2, Extended European Search Report, Feb. 1, 2023.

(Continued)

*Primary Examiner* — Nicholas P D'Aniello
*Assistant Examiner* — Albert Michael Hilton
(74) *Attorney, Agent, or Firm* — Jones Day

(57) ABSTRACT

Systems and methods are provided for a battery module. A battery module includes a module housing configured to hold a cell stack comprising a plurality of battery cells. A busbar assembly having an electrically conductive busbar is configured for electrical connection to electrode leads of the battery cells. The busbar assembly includes a gas outlet configured for discharging gas generated within the plurality of battery cells in a direction away from the cell stack, and the module housing includes a venting member configured to vent the gas discharged from the gas outlet to an outside of the module housing.

18 Claims, 20 Drawing Sheets

(56)        References Cited

U.S. PATENT DOCUMENTS

| | | | |
|---|---|---|---|
| 2011/0274951 A1* | 11/2011 | Yasui | H01M 50/512 |
| | | | 429/99 |
| 2018/0183020 A1* | 6/2018 | Ju | H01M 50/516 |
| 2019/0245193 A1* | 8/2019 | Kim | H01M 50/553 |
| 2020/0287252 A1* | 9/2020 | Li | H01M 10/6552 |
| 2021/0028517 A1 | 1/2021 | Choi et al. | |
| 2021/0050573 A1 | 2/2021 | Lee | |
| 2021/0075077 A1* | 3/2021 | Kwag | H01M 10/613 |
| 2021/0226189 A1* | 7/2021 | Juzkow | H01M 10/486 |
| 2021/0320374 A1 | 10/2021 | Lee et al. | |
| 2022/0021060 A1 | 1/2022 | Yoo et al. | |
| 2022/0029222 A1 | 1/2022 | Lee | |
| 2022/0115736 A1 | 4/2022 | Oh et al. | |
| 2022/0115737 A1* | 4/2022 | Shin | H01M 10/613 |
| 2022/0247046 A1* | 8/2022 | Lee | H01M 50/593 |
| 2023/0090932 A1* | 3/2023 | Misawa | H01M 50/557 |
| | | | 429/61 |

FOREIGN PATENT DOCUMENTS

| | | | | |
|---|---|---|---|---|
| EP | 3866252 A1 | 8/2021 | | |
| KR | 10-2020-0107213 | 9/2020 | | |
| KR | 10-2020-0107214 A | 9/2020 | | |
| KR | 10-2020-0110081 | 9/2020 | | |
| KR | 10-2020-0143977 | 12/2020 | | |
| KR | 10-2021-0004189 A | 1/2021 | | |
| KR | 10-2021-0011642 | 2/2021 | | |
| KR | 10-2021-0077498 A | 6/2021 | | |
| WO | WO-2021002626 A1 * | 1/2021 | | A62C 3/16 |
| WO | WO-2021107429 A1 * | 6/2021 | | H01M 50/213 |
| WO | WO-2021177150 A1 * | 9/2021 | | H01M 50/121 |

OTHER PUBLICATIONS

Korean Intellectual Property Office, Appl. 10-2021-0124168, Office Action, Aug. 28, 2025.

* cited by examiner

A

------> GAS

BATTERY MODULE

CROSS-REFERENCE TO RELATED APPLICATION(S)

This application claims benefit of priority to Korean Patent Application No. 10-2021-0124168 filed on Sep. 16, 2021 in the Korean Intellectual Property Office, the disclosure of which is incorporated herein by reference in its entirety.

BACKGROUND

1. Field

The present disclosure relates to a battery module having a cell stack in which a plurality of battery cells are stacked, and more particularly, to a battery module discharging gas generated therein externally.

2. Description of Related Art

Unlike a primary battery, a secondary battery may be repeatedly charged and discharged. Secondary batteries may be utilized in a variety of devices within various fields, such as digital cameras, mobile phones, notebook computers, hybrid vehicles, and electric vehicles. Examples secondary batteries include a nickel-cadmium battery, a nickel-metal hydride battery, a nickel-hydrogen battery, a lithium secondary battery, or the like.

SUMMARY

An aspect of the present disclosure is to provide a battery module minimizing a thermal propagation phenomenon by inducing rapid discharging of gas generated within a battery cell externally.

An aspect of the present disclosure is to provide a battery module having a structure for inducing rapid discharging of gas from a portion in which an electrode lead of a battery cell is disposed to an outside of a module housing.

An aspect of the present disclosure is to provide a battery module minimizing thermal propagation between adjacent battery cells.

In one example, systems and methods are provided for a battery module. A battery module includes a module housing configured to hold a cell stack comprising a plurality of battery cells. A busbar assembly having an electrically conductive busbar is configured for electrical connection to electrode leads of the battery cells. The busbar assembly includes a gas outlet configured for discharging gas generated within the plurality of battery cells in a direction away from the cell stack, and the module housing includes a venting member configured to vent the gas discharged from the gas outlet to an outside of the module housing.

According to an aspect of the present disclosure, a battery module includes a cell stack in which a plurality of battery cells respectively having an electrode lead are stacked; a module housing accommodating the cell stack therein; and a busbar assembly having an electrically conductive busbar electrically connected to the electrode lead, wherein a gas outlet discharging gas generated within the plurality of battery cells in an outward direction of the cell stack is formed in the busbar assembly, and the module housing includes a venting member discharging the gas discharged from the gas outlet to an outside of the module housing.

In this case, a flow space in which the gas discharged from the gas outlet flows may be formed between an outer side surface of the busbar assembly and an inner side surface of the module housing, and the venting member may be provided in a position corresponding to the flow space in the module housing.

In addition, the busbar assembly may further include an insulating support plate on which the busbar is installed, the gas outlet may be formed to pass through at least one of the support plate and the busbar. In this case, the gas outlet may include an insulator outlet formed in the support plate, and a busbar outlet communicating with the insulator outlet and formed in the busbar. A coupling hole to which the electrode lead is coupled may be formed in the busbar, and the busbar outlet may have a shape having a width, wider than a width of the coupling hole. In addition, the busbar outlet may be integrally formed with the coupling hole.

Further, a through-hole through which the electrode lead passes may be formed in the support plate to couple the electrode lead to the busbar, wherein the insulator outlet may be integrally formed with the through-hole.

The flow space may extend on a first plane, perpendicular to a longitudinal direction of each of the plurality of battery cells, and the venting member may be provided on one or both sides of the flow space in the module housing, based on an extending direction of the flow space.

In addition, the venting member may be provided on a surface of the module housing opposing the gas outlet.

The battery module may further include a filler covering at least a portion of the cell stack. The filler may be accommodated in at least a portion of a first space formed between the cell stack and an inner side surface of the busbar assembly. In this case, the electrode lead may be located on both end portions of each of the plurality of battery cells in a longitudinal direction of each of the plurality of battery cells, the busbar assembly may be coupled to the electrode lead on both end portions of each of the plurality of battery cells in the longitudinal direction, and the first space may be located on both sides of the plurality of battery cells in the longitudinal direction.

Further, the filler may be accommodated in at least a portion of a second space formed between an upper side of the cell stack and the inner side surface of the module housing opposing the upper side of the cell stack.

The filler may be formed of a material having a heat resistant temperature of 100 degrees Celsius or more. The filler may include at least a portion of ceramic, graphite, alumina, or a heat-resistant plastic.

The cell stack may include a thermal propagation blocking member blocking diffusion of at least one of heat or flames between the plurality of battery cells. The thermal propagation blocking member may be formed of a fire-resistant material and a heat-insulating material. The thermal propagation blocking member may include at least a portion of mica, kaolin, aerogel, silicone, or ceramic.

In addition, the thermal propagation blocking member may cross a first space formed between the cell stack and an inner side surface of the busbar assembly, to be coupled to the busbar assembly.

The venting member may include a venting hole formed in the module housing. The venting member may include a venting hole formed in the module housing, and a venting unit installed in the venting hole, and the venting member may have a structure that is opened when gas is discharged.

Each of the plurality of battery cells may be formed of a pouch-type secondary battery including an electrode accommodating portion accommodating an electrode assembly therein, a sealing portion sealing at least a portion of a circumference of the electrode accommodating portion, and the electrode lead electrically connected to the electrode assembly.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
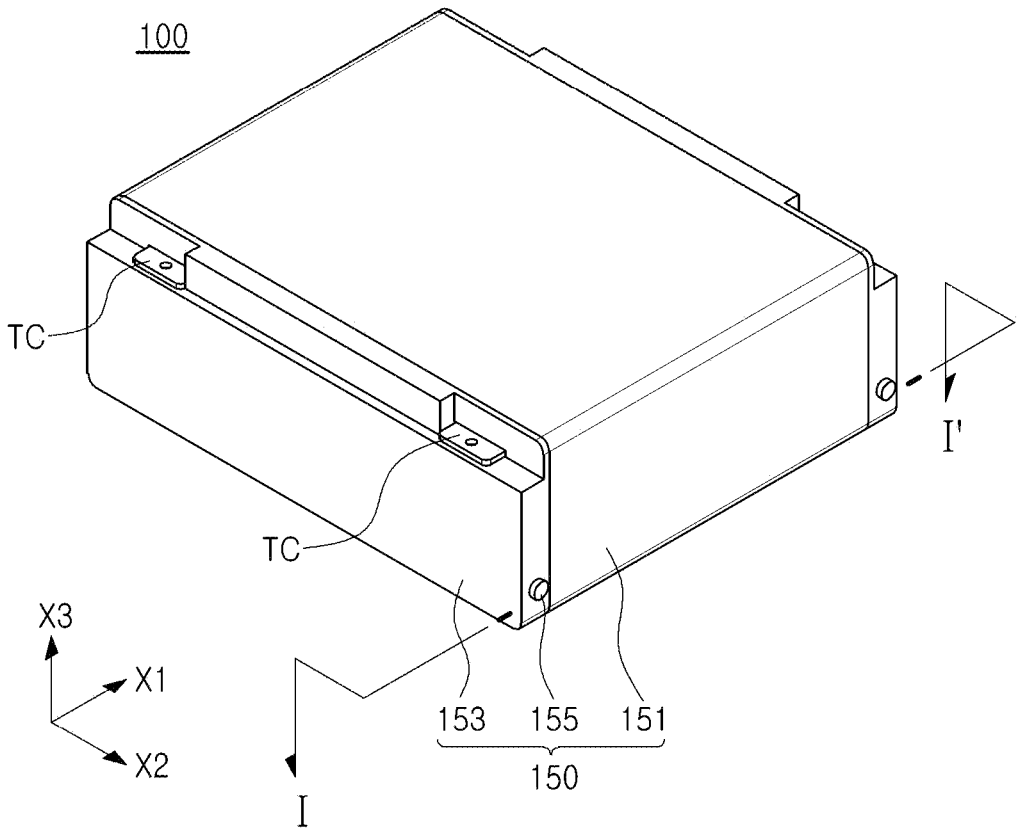
FIG. 1 is a perspective view of a battery module according to an embodiment of the present disclosure.

Prior to the detailed description of the present disclosure, terms or words used in the specification and claims, described below, should not be construed as being limited to ordinary or dictionary meanings. Terms should be interpreted as having a meaning and concept consistent with the technical idea of the present disclosure. It should be understood that because embodiments described in the specification and configurations illustrated in the drawings may be only the most preferred embodiments of the present disclosure, and do not represent all the technical ideas of the present disclosure.

Hereinafter, preferred embodiments of the present disclosure will be described in detail with reference to the accompanying drawings. It should be noted that the same components in the accompanying drawings may be denoted by the same reference numerals as much as possible. Some components may be exaggerated, omitted, or schematically illustrated in the accompanying drawings, and a size of each of the components may not fully reflect an actual size thereof.

Certain systems and methods herein describe lithium secondary batteries having high energy density and a high discharge voltage. Lithium secondary batteries may be manufactured and used as a pouch-type battery cell having flexibility. Those secondary batteries may also be implemented as a can-type battery cell having a prismatic or cylindrical shape having rigidity. A plurality of battery cells may be electrically connected to form a cell stack, and may be disposed in a module housing to form a battery module.

Battery cells may experience certain events. For example, when a battery cell reaches the end of its life, when a swelling phenomenon occurs in the battery cell, when overcharging in the battery cell occurs, when the battery cell is exposed to heat, when a sharp object such as a nail penetrates an external material, when an external shock is applied to the battery cell, or the like, gas of an electrolyte of the cell may leak to the outside of the battery cell. When such events occur, a large amount of electrolyte gas may be exposed through a sealing portion of a pouch (an external material). A venting hole (a vent portion, a gas exhaust port, or a gas passage port) on a wall surface of a module housing may be used to discharge electrolyte gas generated within an inner space of a battery module to an outside of a battery pack.

In some instances, an ignition even may occur in one of a plurality of spaces in a battery module (e.g., spaces present due to a shape of a battery cell, a connection structure between the battery cell and a busbar, an arrangement structure of the battery cell accommodated in a module housing, or the like). When ignition occurs in the battery cell, a high-temperature electrolyte gas (gas, flames, combustible material) may be ejected into those spaces.

In some instances, a battery module not have a sufficient structure to induce rapid discharging of gas generated in the module housing to the outside of the module housing through a venting hole present in the module. In such instances, there may be a risk of thermal propagation, where high-temperature gas and heat propagating after ignition of a battery cell subsequently propagate to an adjacent battery cell, causing ignition of the adjacent battery cell to occur. Systems and methods as described herein may, in some embodiments, address this phenomenon.

First, a battery module 100 according to an embodiment of the present disclosure will be described with reference to FIGS. 1 to 11.

FIG. 1 is a perspective view of a battery module 100 according to an embodiment of the present disclosure. Referring to FIG. 1, a battery module 100 may include a module housing 150. The module housing 150 may include a housing body 151 having a space for accommodating components such as a battery cell (120 in FIG. 2) and the like therein having both ends open, and an end plate 153 covering both open ends of the housing body 151. Although the housing body 151 is illustrated as having an integrated structure having a tube shape in FIG. 1, the housing body 151 may be divided and manufactured into two or more plates and then integrated, and various modifications thereof.

A venting member 155 for discharging gas generated in the module housing 150 externally may be provided on an outside of the module housing 150. The venting member 155 may serve to discharge the electrolyte gas, the flames, and the combustion material to the outside of the module housing 150. In addition, the module housing 150 may be provided with an external connection terminal TC electrically connected to a busbar (140 in FIG. 2).

Figure 2:
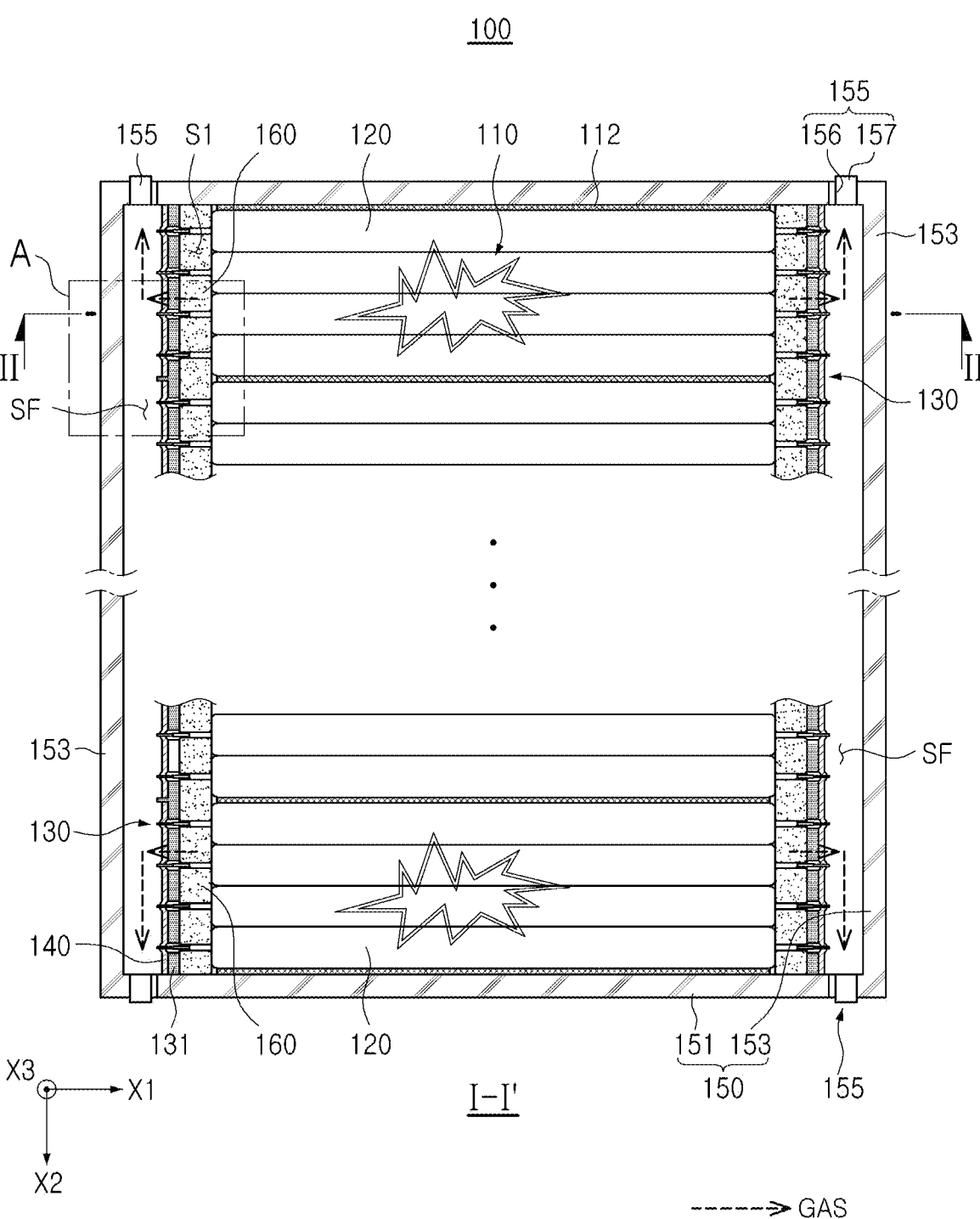
FIG. 2 is a cross-sectional view of FIG. 1, taken along line I-I'.
Figure 3:
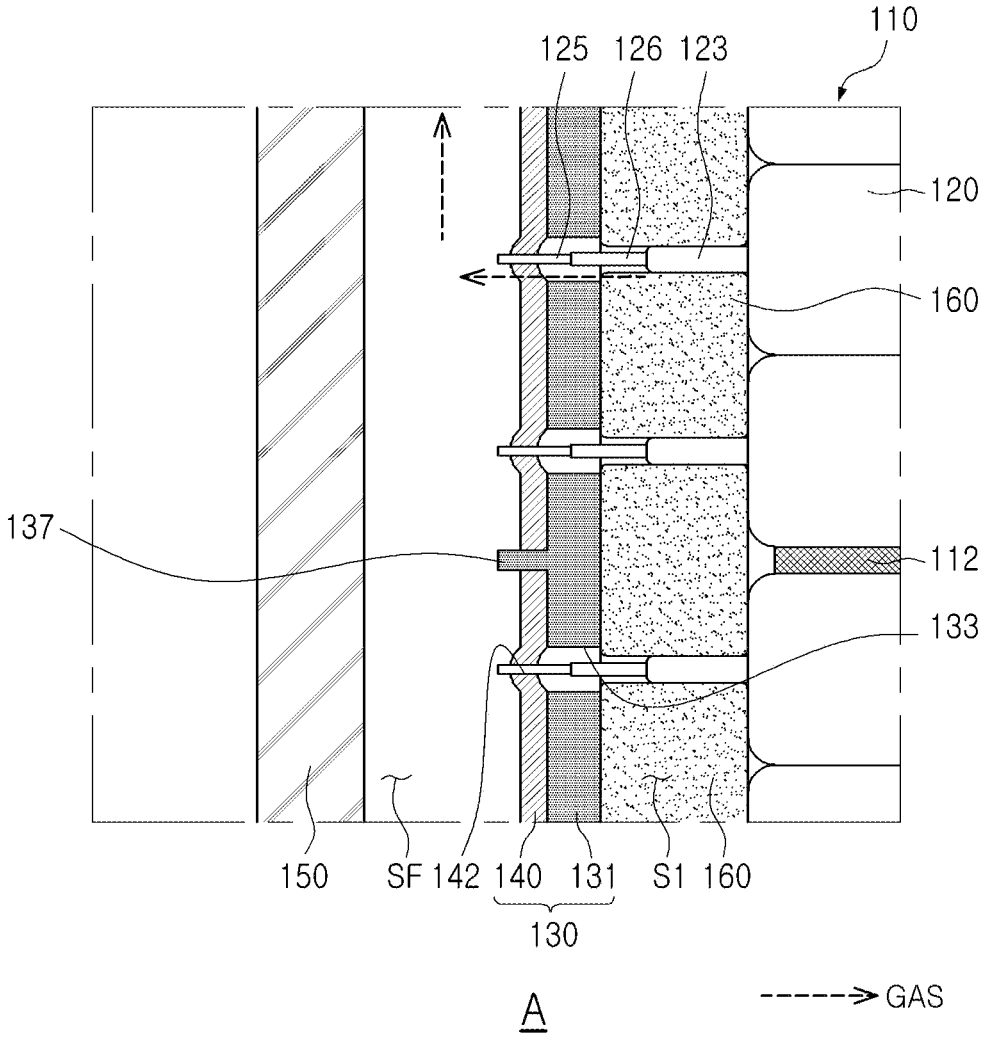
FIG. 3 is an enlarged view of portion A of FIG. 2.
Figure 4:
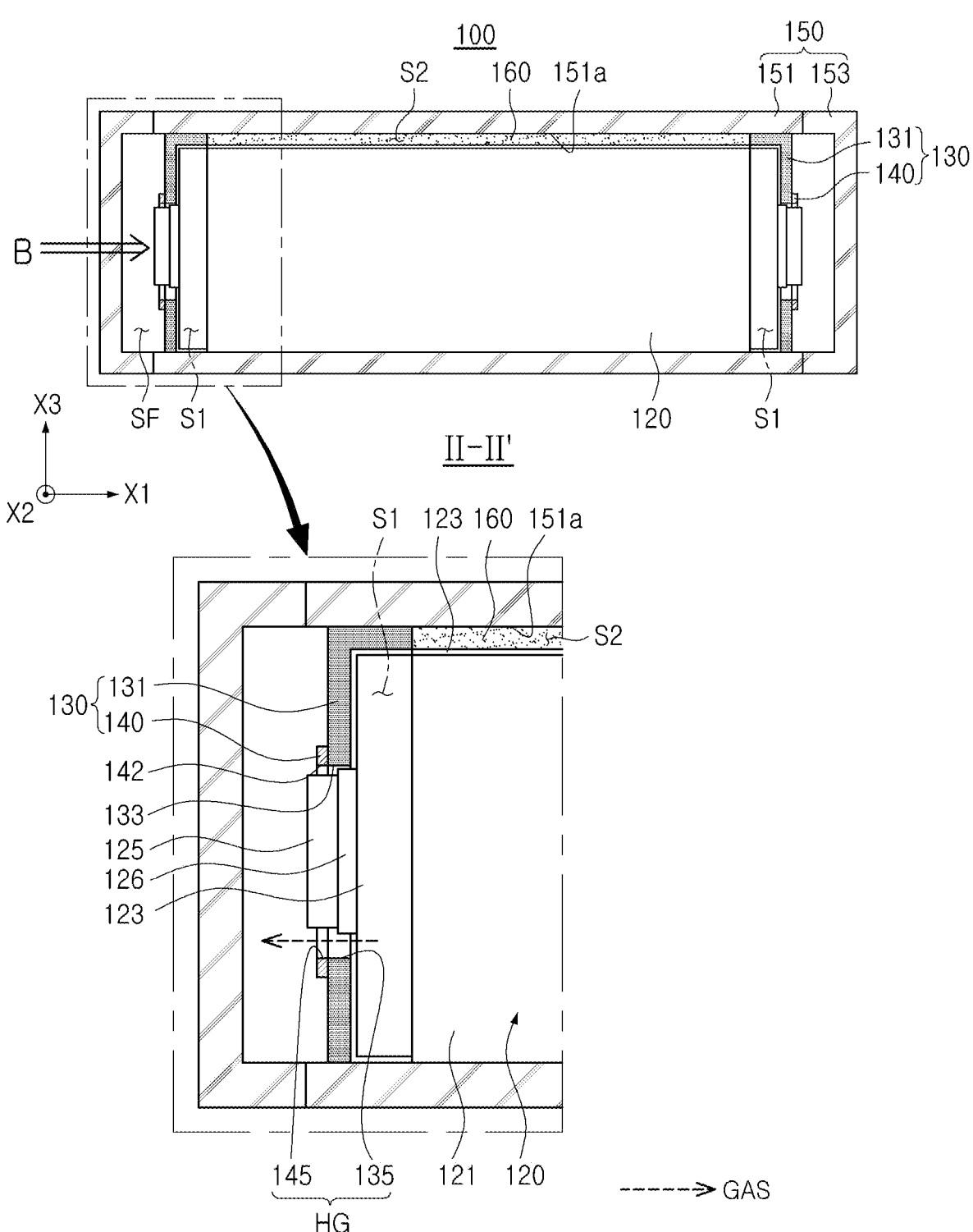
FIG. 4 is a cross-sectional view of FIG. 2, taken along line II-II'.

FIG. 2 is a cross-sectional view of FIG. 1, taken along line I-I', FIG. 3 is an enlarged view of portion A of FIG. 2, and FIG. 4 is a cross-sectional view of FIG. 2, taken along line II-II'.

Referring to FIGS. 2 to 4, in a battery module 100 according to an embodiment of the present disclosure, a cell stack 110 and a busbar assembly 130 may be accommodated in the module housing 150.

The cell stack 110 may be formed by stacking a plurality of battery cells 120. Each of the battery cells 120 may include an electrode lead 125 exposed externally. The electrode lead 125 includes a positive electrode lead and a negative electrode lead. As an example, the battery cell 120 may be configured as a pouch-type secondary battery in which the electrode lead 125 may be exposed externally through a sealing portion 123. An insulating portion 126 formed of an insulating material such as an insulating film or the like may be disposed between the electrode lead 125 and the sealing portion 123.

At least one buffer pad 112 may be disposed in the cell stack 110. The buffer pad 112 may be disposed between the battery cells 120, and may be disposed between the battery cells 120 and a sidewall of the module housing 150. The buffer pad 112 may be compressed and elastically deformed when a specific battery cell 120 expands due to a swelling phenomenon. In some instances, this may suppress expansion of an entire volume of the cell stack 110, which may be undesirable. The buffer pad 112 may be formed of a foam having a polyurethane material, but a material thereof is not limited thereto.

The busbar assembly 130 may include an electrically conductive busbar 140 electrically connected to the electrode lead 125, and a support plate 131 formed of an insulating material for insulation between the busbar 140.

A coupling hole 142 through which the electrode lead 125 passes may be formed in the busbar 140. The electrode lead 125 and the busbar 140 may be coupled to each other by welding, such that the electrode lead 125 passes through the coupling hole 142, for example, where the electrode lead 125 protrudes toward an outside of the coupling hole 142.

The support plate 131 may be disposed between the busbar 140 and the battery cell 120 to support the busbar 140, and a through-hole 133 may be formed in the support plate 131 such that the electrode lead 125 passes therethrough. The support plate 131 may include a partition protrusion 137 to electrically separate adjacent busbars 140.

A flow space SF through which gas discharged from the battery cell 120 flows may be formed between an outer side surface of the busbar assembly 130 and an inner side surface of the module housing 150.

In addition, a venting member 155 may be provided in a position corresponding to the flow space SF in the module housing 150. Gas discharged from the battery cell 120 may flow through the flow space SF and may be then discharged to an outside of the module housing 150 through the venting member 155. As an example, the flow space SF may extend onto a first plane (an X2-X3 plane) of the battery cell 120, perpendicular to a longitudinal direction X1. In some instances, the battery cell 120 may have the electrode lead 125 on both ends in the longitudinal direction X1, respectively, and the flow space SF may be disposed on both ends of the battery cell 120 in the longitudinal direction X1 to respectively correspond to the electrode lead 125.

The venting member 155 may be provided in a position corresponding to the flow space SF in the module housing 150, to discharge gas flowing through the flow space SF to the outside of the module housing 150. The venting member 155 may be provided on both ends of the flow space SF as illustrated in FIGS. 1 and 2, but the present disclosure is not limited thereto, and may be provided only on one end of the flow space SF (see FIG. 10). In addition, the flow space SF may be disposed on both ends of the battery cell 120 in the longitudinal direction X1, and in this case, at least one venting member 155 may be installed in the flow space SF, respectively.

The venting member 155 may, in an embodiment, take the form of a venting hole 156 formed in a wall surface of the module housing 150. The venting hole 156 may have an open structure. In another embodiment, the venting member 155 may include a venting hole 156 formed in the wall surface, and a venting unit 157 installed in the venting hole 156. The venting unit 157 may have a structure fixed to the venting hole 156, where that structure may be configured to be detachably coupled. The venting unit 157 may have a predetermined length in a discharge direction to induce external discharge of gas. To facilitate this, in embodiments, the venting unit may have a structure extending toward the outside of the module housing 150. In addition, the venting unit 157 may have a structure that can transition from a closed state to an open state. In an example, he venting unit 157 may normally have a closed state such that external air does not easily flow into the module housing 150, where that structure may transition to an open state when gas is discharged (e.g., when an internal pressure of the module housing 150 rises beyond a threshold level). A structure of the venting unit 157, which may be opened when gas is discharged, may take the form of a flap structure, a valve structure, or the like.

In FIGS. 1 and 2, the venting member 155 is provided on the end plate 153. In some embodiments, when communication between the venting member 155 and the flow space SF is possible, an installation position of the venting member 155 may be otherwise positioned. For example, the venting member 155 may be provided in at least a portion of a front surface, a rear surface, an upper surface, a lower surface, and both side surfaces of the module housing 150. For example, the venting member 155 may be installed in a position corresponding to the flow space SF in the module housing 150. In addition, the number of venting members 155 to be installed may be varied.

A battery module 100 according to an embodiment of the present disclosure may further include a filler 160 covering at least a portion of the cell stack 110. The filler 160 may serve to prevent gas generated within the battery cell 120 from flowing into an arbitrary (e.g., undesirable) space in the module housing 150 or from propagating to an adjacent battery cell 120. For example, the filler 160 may perform a function of minimizing remaining an electrolyte gas, flames, and a combustion material, discharged from one battery cell 120 into a space around the cell stack 110 such that it affects an adjacent battery cell 120 (e.g., in an event such as ignition or the like). The filler 160 may facilitate guiding gas discharge external to the cell stack 110. In addition, the filler 160 may serve to minimize or delay opening of the sealing portion 123.

Referring to FIGS. 2 and 3, a first space S1 may be formed between an inner side surface of the busbar assembly 130 and the cell stack 110. In an embodiment of the present disclosure, because the electrode lead 125 may be located on both ends of the battery cell 120 in the longitudinal direction X1, and the busbar assembly 130 may be coupled to the electrode lead 125 on both ends of the battery cell 120 in the longitudinal direction X1, the first space S1 may be located on both sides of the battery cell 120 in the longitudinal direction X1.

In the battery cell 120, because a thickness of the sealing portion 123 may be thinner than a thickness of an electrode accommodating portion (122 in FIG. 7) in which an electrode assembly (127 in FIG. 7) is accommodated, a space may be present between sealing portions 123. A first space S1 may correspond to the space present between the sealing portions 123 of the battery cells 120. In addition, because the weakest adhesive force of the sealing portion 123 in the battery cell 120 is provided around the electrode lead 125, gas discharge of the battery cell 120 may occur in the sealing portion 123 in which the electrode lead 125 is installed.

The filler 160 may function to fill at least a portion of the first space S1 such that gas discharged from the battery cell 120 does not remain in the first space S1. For example, the filler 160 may fill the first space S1 between the sealing portion 123 (123a in FIG. 7) of the battery cell 120 and between the inner side surface of the busbar assembly 130 and the cell stack 110, such that gas discharged from the battery cell 120 is discharged into the flow space SF without remaining in the first space S1. In addition, because the filler 160 may be filled between the sealing portions 123, pressure may be applied when the sealing portion 123 is deformed. Therefore, it may also perform a function of preventing the sealing portion 123 from being opened.

Referring to FIG. 4, a second space S2 may be present between an upper side of the cell stack 110 and an inner side surface 151a of the module housing 150 opposite thereto. The filler 160 may function to fill at least a portion of the second space S2 such that gas discharged from the battery cell 120 does not move into the second space S2. When the sealing portion 123 is formed on an upper side of the pouch-type battery cell 120 and a pressure in the battery cell 120 increases, an upper sealing portion 123 (123b in FIG. 7) may be opened. In this case, when the filler 160 may filled in at least a portion of the second space S2. This may enable the filler 160 to act as a resistance to deformation of the upper sealing portion 123 such that gas discharge through the upper sealing portion 123 may be minimized.

The filler 160 may have sufficient heat resistance and/or fire resistance to respond to an event situation such as ignition of the battery cell 120 or the like. For example, the filler 160 may have a heat resistant temperature of 100 degrees Celsius or higher such that it does not melt or burn, even at a high temperature. In addition, the filler 160 may be formed of an insulating material. In embodiments, the filler 160 may include at least a portion of ceramic, graphite, alumina, or heat-resistant plastic. To facilitate installing the filler 160 around the cell stack 110, there may be a method of forming the filler 160 to have a shape corresponding to at least a portion of the first space S1 and/or the second space S2 using a technique such as injection molding, and then installing the same in the first space S1 and/or the second space S2. In another example, a gel-type raw material may be applied to at least a portion of the first space S1 and/or the second space S2.

As such, according to an embodiment of the present disclosure, the filler 160 may be installed in the first space S1 and/or the second space S2, corresponding to the periphery of the cell stack 110, to guide to easily discharge gas discharged from the battery cell 120 toward the flow space SF through a gas outlet HG without remaining in the first space S1 and/or the second space S2.

Referring to FIG. 4 together with FIGS. 2 and 3, in the busbar assembly 130, a gas outlet HG may be formed for discharging gas generated within the battery cell 120 in an outward direction of the cell stack 110, for example, in the longitudinal direction X1 of the battery cell 120 externally. The gas generated within the battery cell 120 may be mainly be present via the sealing portion 123 in which the electrode lead 125 is disposed. The gas outlet HG may be formed in the busbar assembly 130 to provide a gas discharge direction that corresponds to an extension direction of the sealing portion 123/the electrode lead 125. Thus, in embodiments, the gas discharged through the sealing portion 123 of the battery cell 120 may be further discharged into the flow space SF through the gas outlet HG formed in the busbar assembly 130. In addition, because the filler 160 may be configured to fill at least a portion of the first space S1, the gas discharged from the battery cell 120 may be discharged into the flow space SF through the gas outlet HG without remaining in the first space S1.

The gas moving from the battery cell 120 to the flow space SF through the gas outlet HG may be discharged to an outside of the module housing 150 through the venting member 155 communicating with the flow space SF. Gas discharge of the battery cell 120 may be guided via the gas outlet HG that, in embodiments, is directly formed in the busbar assembly 130.

The gas outlet HG may be formed to pass through at least one of the support plate 131 and the busbar 140. In some examples, the gas outlet HG may be provided in both of the support plate 131 and the busbar 140. While in other examples, that gas outlet may be provided in only one of support plate 131 and busbar 140. For example, because an area of the support plate 131 may be larger than an area of the busbar 140, the gas outlet HG may be formed only on the support plate 131. In addition, the gas outlet HG may have a hole shape passing through the support plate 131 and/or the busbar 140 and may have a groove shape.

The gas outlet HG may include an insulator outlet 135 formed in the support plate 131, and a busbar outlet 145 in communication with the insulator outlet 135 and formed in the busbar 140.

Figure 5:
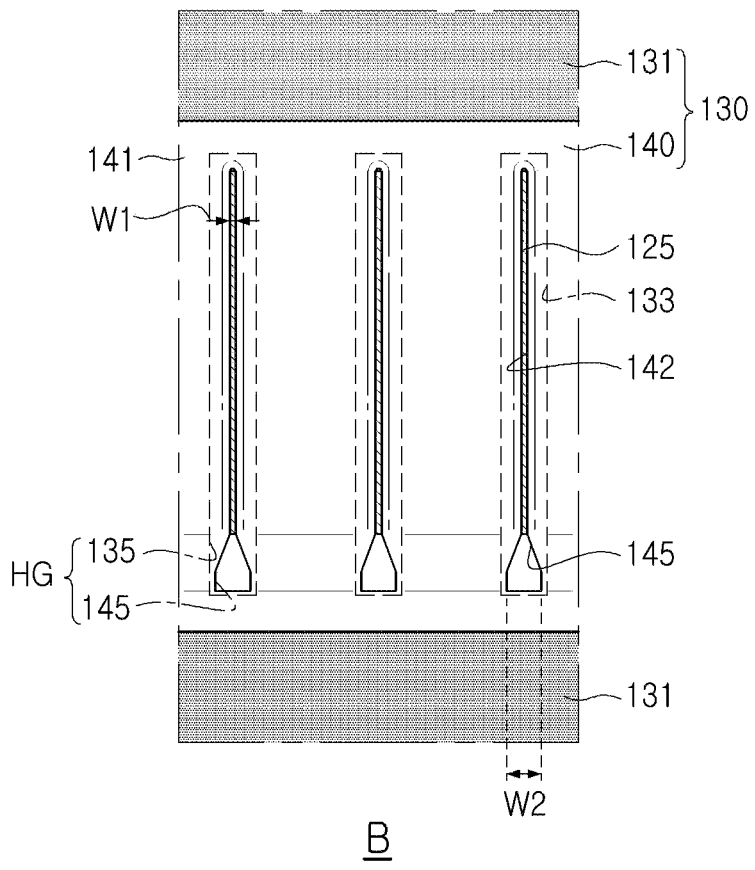
FIG. 5 is a schematic view of the busbar assembly of FIG. 4, viewed in direction B.

FIG. 5 is a schematic view of the busbar assembly of FIG. 4, viewed in direction B. Referring to FIGS. 4 and 5 together, the coupling hole 142 to which the electrode lead 125 is coupled may be formed in the busbar 140, and the busbar outlet 145 may be integrally formed with the coupling hole 142, to have a structure communicating with the coupling hole 142. The busbar outlet 145 may have a shape in which a width W2 of the busbar outlet 145 is wider than a width W1 of the coupling hole 142, to easily discharge gas. For example, the busbar outlet 145 may have a shape extending in a width direction, compared to the coupling hole 142. The busbar outlet 145 and the coupling hole 142 may have a structure not integrally connected to each other, but separated from each other.

In this manner, because the busbar outlet 145 may be installed adjacent to the coupling hole 142, gas discharged from the sealing portion 123 around the electrode lead 125 may be easily discharged into the flow space SF through the busbar outlet 145 located in an extension direction of the electrode lead 125.

Also, the through-hole 133 through which the electrode lead 125 passes may be formed in the support plate 131 such that the electrode lead 125 is coupled to the busbar 140. The insulator outlet 135 may be integrally formed with the through-hole 133 to have a structure communicating with the through-hole 133. The insulator outlet 135 and the through-hole 133 may have a structure separated from each other. The through-hole 133 may have a width, wider than a width of the coupling hole 142 for passage of the electrode lead 125. Thus, in some instances, the insulator outlet 135 may have a width, equal or similar to the width of the through-hole 133.

Figure 6:
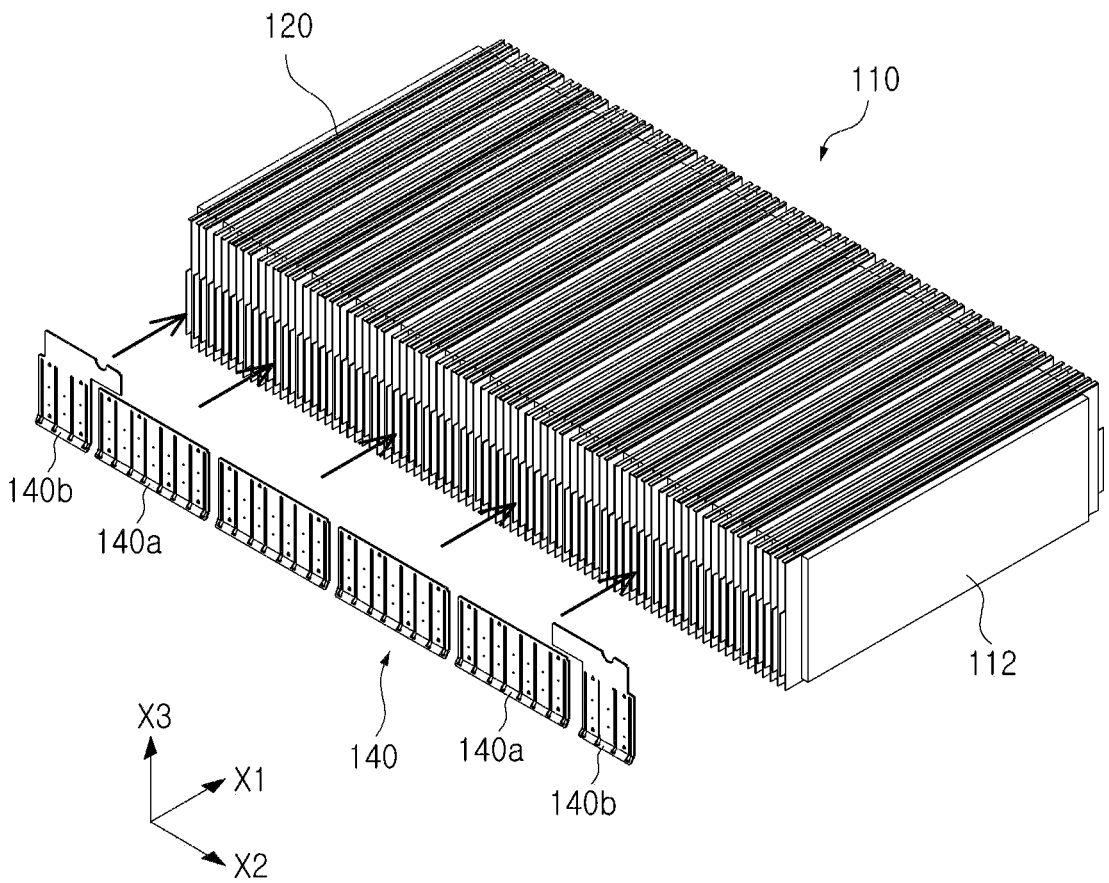
FIG. 6 is a perspective view illustrating a connection state between the cell stack and the busbar, illustrated in FIG. 2.

FIG. 6 is a perspective view illustrating a connection state between the cell stack 110 and the busbar 140 illustrated in FIG. 2. To illustrate a structure of the busbar 140, a structure of the busbar assembly 130 except for the support plate 131 is provided. As illustrated in FIG. 6, the plurality of battery cells 120 may be stacked to form the cell stack 110, and the buffer pad 112 may be provided in the cell stack 110. The busbar 140 may include a first busbar 140*a* electrically connecting the plurality of battery cells 120, and a second busbar 140*b* connecting the battery cells 120 and the external connection terminal (TC in FIG. 1), and the electrode lead 125 of the battery cell 120 may be connected to the busbar 140.

Figure 7:
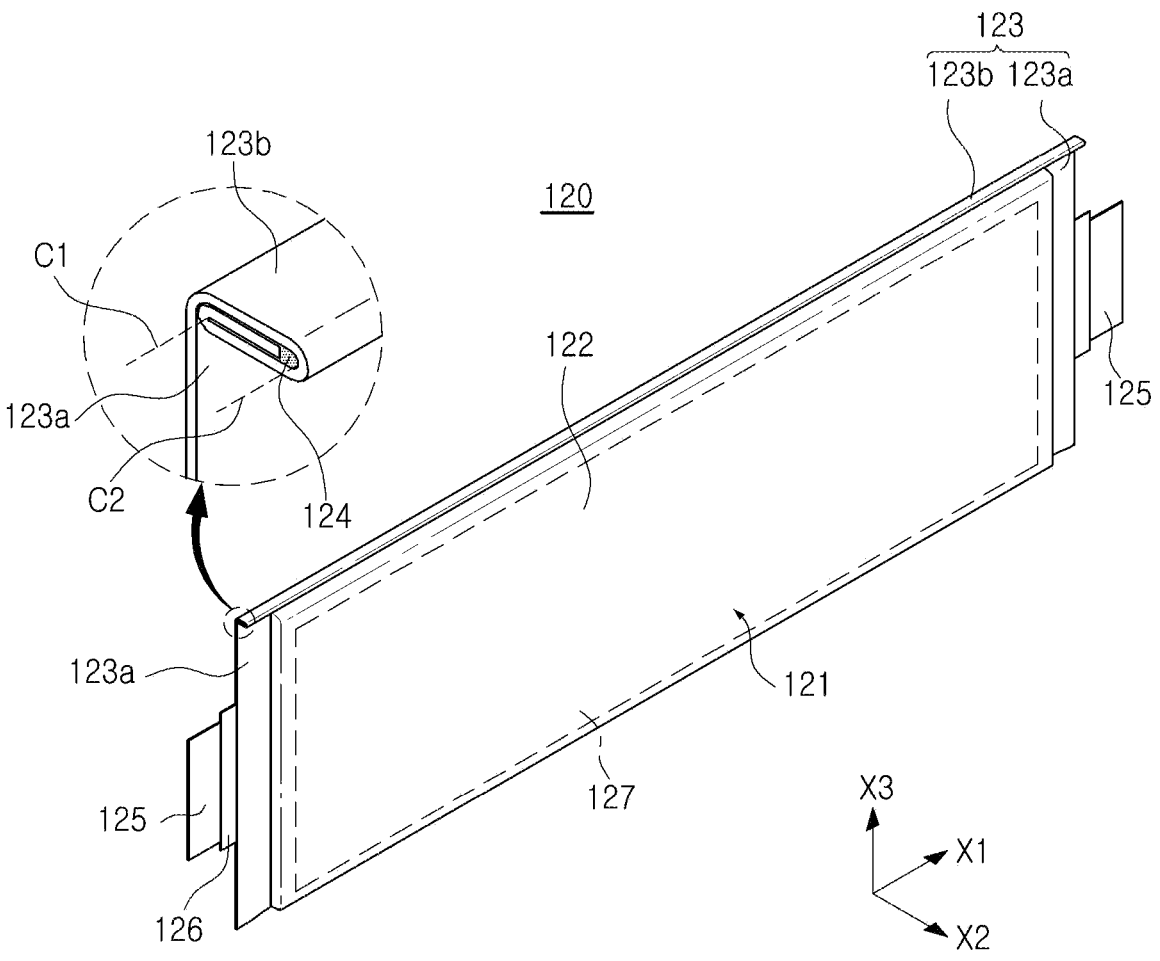
FIG. 7 is a perspective view of a battery cell according to an embodiment of the present disclosure.

FIG. 7 is a perspective view of a battery cell 120 according to an embodiment of the present disclosure. In an embodiment of the present disclosure, a battery cell 120 may be configured as a pouch-type secondary battery, and may have a structure in which an electrode lead 125 protrudes externally.

The battery cell 120 may have a shape in which an electrode assembly 127 is accommodated in a pouch 121 forming an exterior material, and may have a structure in which a portion of the electrode lead 125 is exposed to an outside of the pouch 121.

The pouch 121 may be divided into an electrode accommodating portion 122 and a sealing portion 123. The electrode accommodating portion 122 may be formed in a container shape to provide a space in which the electrode assembly 127 and an electrolyte are accommodated. The electrode assembly 127 may include a plurality of electrode plates (not illustrated) and a plurality of electrode tabs (not illustrated), and may be accommodated in the pouch 121. In this case, an electrode plate may include a positive electrode plate and a negative electrode plate. The electrode assembly 127 may have a form in which the positive electrode plate and the negative electrode plate are stacked with a separator interposed therebetween in the thickness direction X2, with a wide surface of the positive electrode plate and a wide surface of the negative electrode plate opposing each other. An electrode tab may be disposed on a plurality of positive electrode plates and a plurality of negative electrode plates, respectively. Electrode tabs having the same polarity may be in contact with each other, to be connected to electrode leads 125 having the same polarity. For example, an electrode lead 125 may be electrically connected to an electrode plate of the electrode assembly 127 through an electrode tab.

A sealing portion 123 may be a portion to which portions of the pouch 121 are bonded to seal a circumference of the accommodating portion 122. In some examples, the sealing portion 123 may be formed to have a flange shape extending outward from the accommodating portion 122 formed in a container shape and may be disposed along a periphery of the accommodating portion 122. A heat-sealing method may be used for bonding the pouch 121 to form the sealing portion 123 in some instances. In the present embodiment, the sealing portion 123 may be divided into a first sealing portion 123*a* in which the electrode lead 125 is disposed, and a second sealing portion 123*b* in which the electrode lead 125 is not disposed. In this case, the electrode lead 125 may have a state covered by the insulating portion 126 to increase a degree of sealing the first sealing portion 123*a* in a position in which the electrode lead 125 is drawn out and secure an electrical insulation state at the same time.

In the present embodiment, the pouch 121 may be prepared by forming a single sheet of exterior material. More specifically, after preparing by forming one or two accommodating portions on a single sheet of exterior material, the pouch 121 may be completed by folding the exterior material such that the accommodating portions form one space (e.g., the accommodating portion 122).

In the present embodiment, the accommodating portion 122 may be formed to have a tetragonal shape. The sealing portion 123 formed by bonding an exterior material may be provided on an exterior of the accommodating portion 122. As described above, the sealing portion 123 may or may not be formed on a surface on which the exterior material is folded. Therefore, in the present embodiment, the sealing portion 123 may be formed on the exterior of the accommodating portion 122 and may be provided only on three surfaces of the accommodating portion 122. In examples, the sealing portion 123 may not be disposed on any one surface (a lower surface in FIG. 7) of the exterior of the accommodating portion 122).

In the present embodiment, the electrode lead 125 may be disposed to face in opposite directions to each other on both sides of the battery cell 120 in the longitudinal direction X1. The electrode lead 125 includes a positive electrode lead and a negative electrode lead. An electrode lead 125 of first polarity (e.g., a positive electrode) may be disposed on one side of the battery cell 120 in the longitudinal direction, and an electrode lead 125 of second polarity (e.g., a negative electrode) may be disposed on the other side of the battery cell 120 in the longitudinal direction. Two electrode leads 125 may be disposed on sealing portions 123 formed on different sides. Therefore, a sealing portion 123 of the present embodiment may be composed of two first sealing portions 123*a* in which electrode leads 125 are disposed, and one second sealing portion 123*b* in which an electrode lead 125 is not disposed. Although FIG. 7 illustrates that a second sealing portion 123*b* is formed on an upper surface of the pouch 121, a second sealing portion 123*b* may be formed on a lower surface of the pouch 121.

A pouch 121 used in an embodiment of the present disclosure is not limited to a structure in which a sealing portion 123 is formed on three surfaces by folding a sheet of exterior material, as illustrated in FIG. 7. For example, it is also possible to form an accommodating portion 122 by overlapping two exterior materials and to form a sealing portion 123 on all four surfaces of a periphery of the accommodating portion 122. In this case, the sealing portion 123 may be composed of two first sealing portions 123*a* in which electrode leads 125 are disposed and two second sealing portions 123*b* in which the electrode leads 125 are not disposed. In this case, the second sealing portion 123*b* may be formed on upper and lower surfaces of a battery cell 120.

In an embodiment of the present disclosure, in a battery cell 120, to increase bonding reliability of the sealing portion 123 and minimize a volume/area of the sealing portion 123, the sealing portion 123 may be formed to have a shape folded at least once. More specifically, the second sealing portion 123*b* in which the electrode lead 125 is not disposed, among the sealing portions 123 according to the present embodiment, may be folded twice, and may be then fixed by an adhesive member 124. For example, the second sealing portion 123*b* may be folded by 180° along a first bending line C1 and then again folded along a second bending line C2, as illustrated in FIG. 7. In this case, an internal space of the second sealing portion 123b may be filled with the adhesive member 124, and a shape of the second sealing portion 123b folded twice by the adhesive member 124 may be maintained. The adhesive member 124 may be formed of an adhesive having high thermal conductivity. For example, the adhesive member 124 may be formed of epoxy or silicone. A battery cell 120 configured as described above may be a nickel-metal hydride (Ni-MH) battery or a lithium ion (Li-ion) battery capable of charging and discharging. The battery cell 120 may be disposed in an inner space of the module housing 150, and a plurality of battery cells 120 may be vertically erected in the inner space of the module housing 150 and stacked in left and right directions, to form a cell stack (110 in FIG. 6). As noted above, the battery cell 120 is not limited to the aforementioned pouch-type secondary battery, and may be configured as a prismatic or cylindrical secondary battery in which an electrode lead is connected to the busbar assembly 130.

Figure 8:
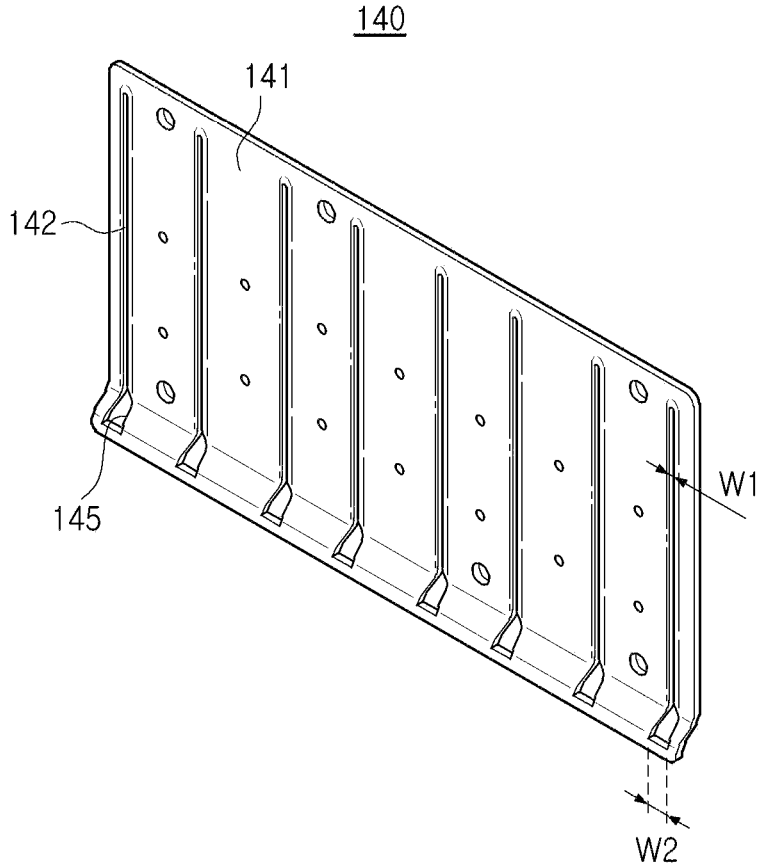
FIG. 8 is a perspective view of a busbar according to an embodiment of the present disclosure.

FIG. 8 is a perspective view of a busbar 140 according to an embodiment of the present disclosure. A busbar 140 may have a configuration in which a coupling hole 142 and a busbar outlet 145 are formed in a busbar body 141. The busbar outlet 145 may have a shape extending in a width direction, compared to the coupling hole 142, such that gas is discharged through the busbar outlet 145. For example, a width W2 of the busbar outlet 145 may be wider than a width W1 of the coupling hole 142. In addition, the busbar outlet 145 may have a shape integrally formed with the coupling hole 142 in a lower portion of the coupling hole 142.

Figure 9:
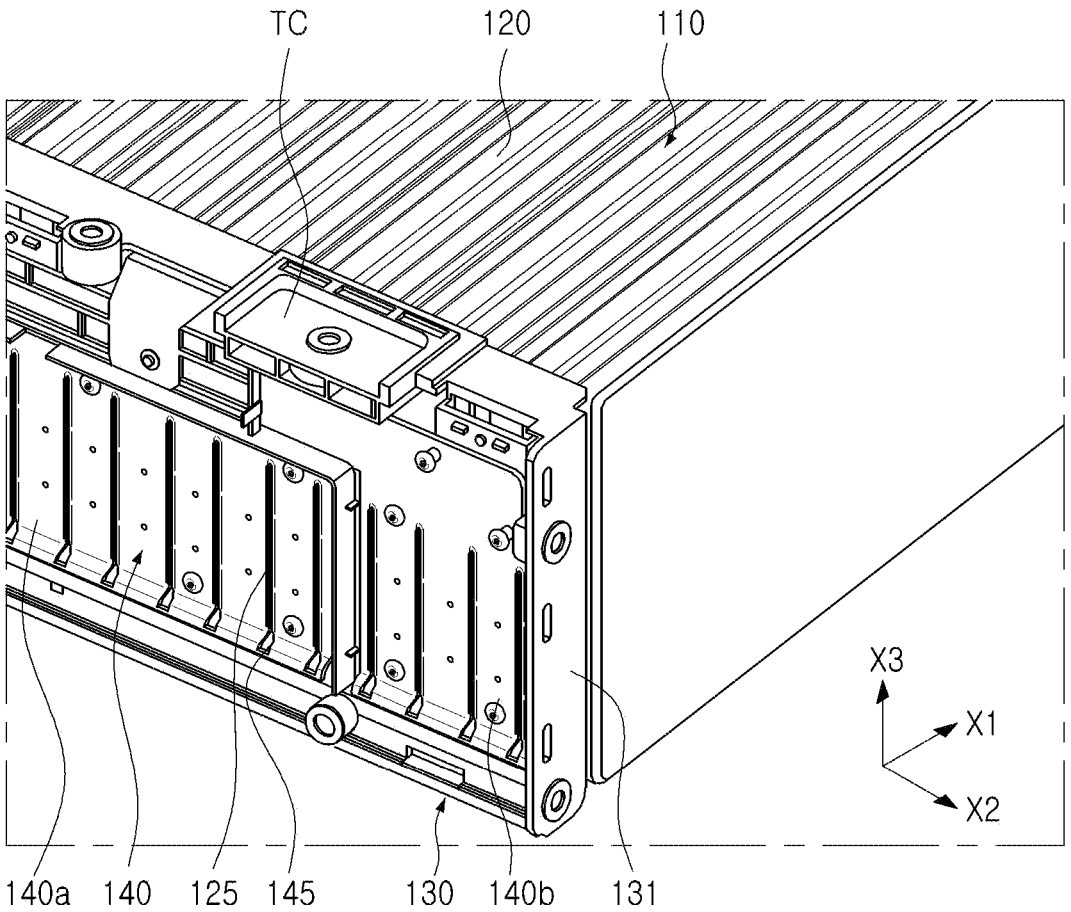
FIG. 9 is a perspective view illustrating an assembly state of a cell stack and a busbar assembly, according to an embodiment of the present disclosure.

FIG. 9 is a perspective view illustrating an assembly state of a cell stack 110 and a busbar assembly 130, according to an embodiment of the present disclosure. In a cell stack 110, a plurality of battery cells 120 may be stacked in the width direction X2, and a busbar assembly 130 may be connected to the cell stack 110 in the length direction X1. The busbar assembly 130 may include a busbar 140 to which an insulating support plate 131 and an electrode lead 125 of a battery cell 120 may be electrically connected. The busbar 140 may include a first busbar 140a and a second busbar 140b. The busbar 140 may include a busbar outlet 145 for discharging gas from the battery cell 120 to an outside of the cell stack 110 adjacent to a portion to which the electrode lead 125 is coupled.

Figure 10:
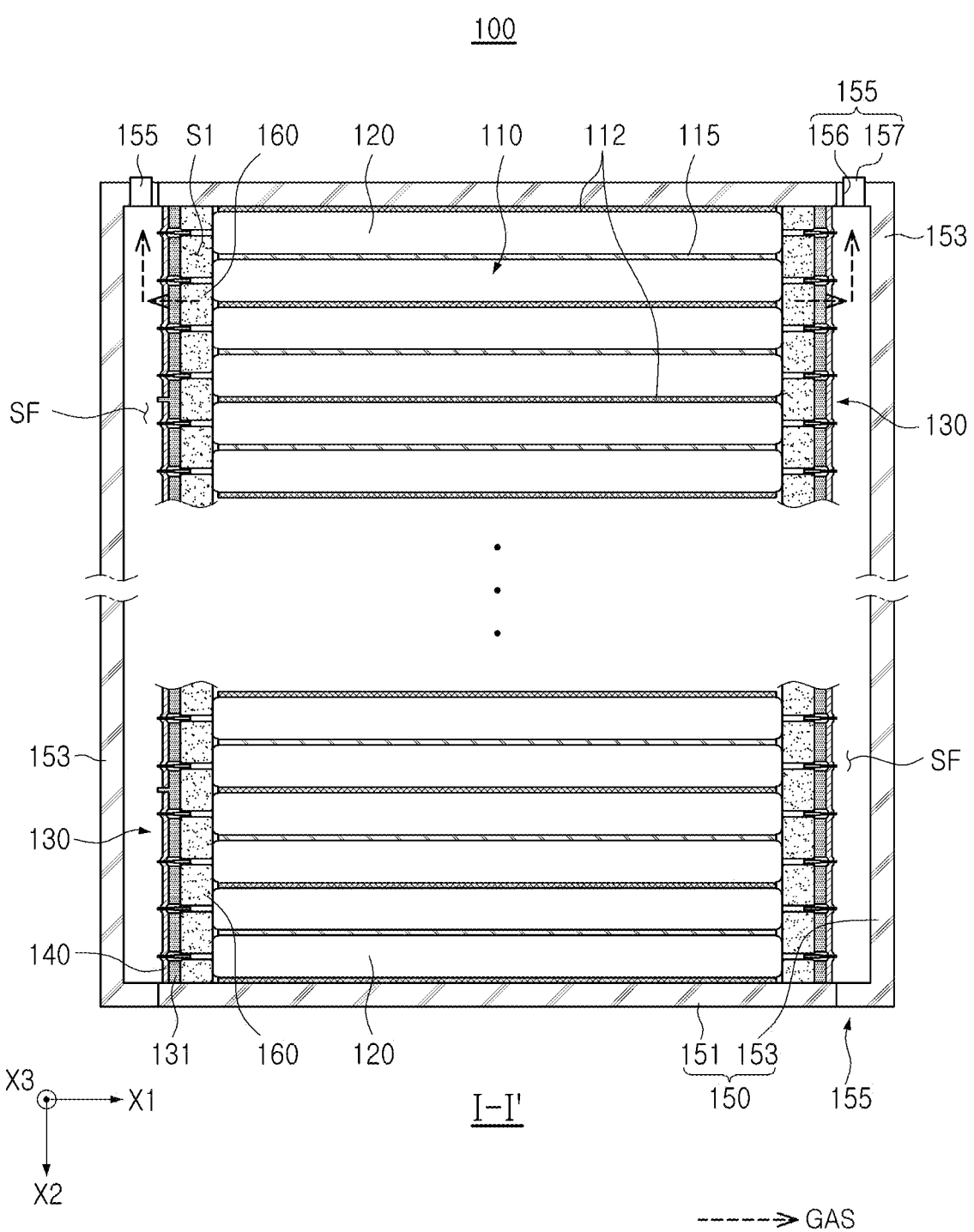
FIGS. 10 and 11 are cross-sectional views illustrating a modified example of the battery module illustrated in FIG. 2.
Figure 11:
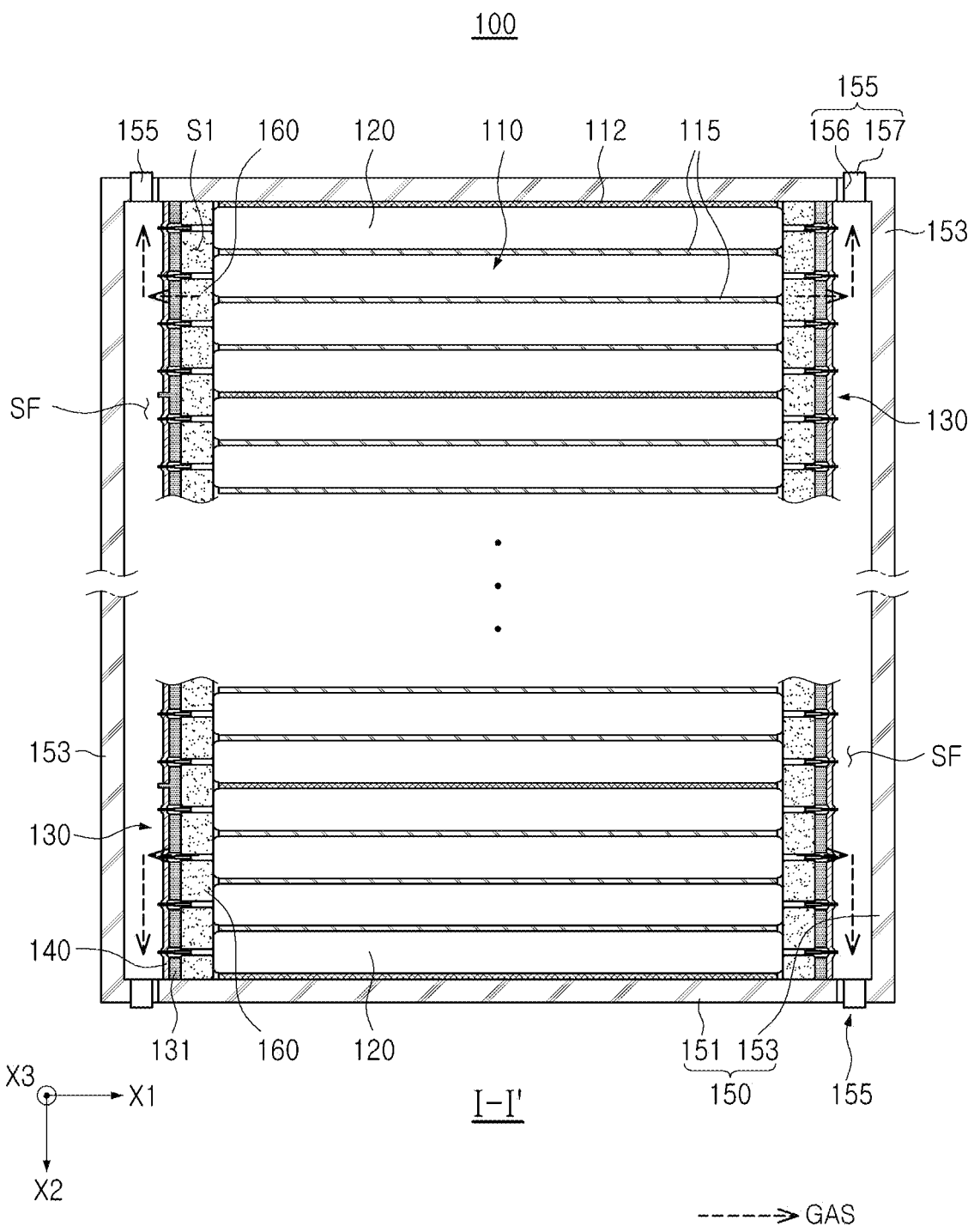

FIGS. 10 and 11 are cross-sectional views illustrating a modified example of the battery module 100 illustrated in FIG. 2. A modified example illustrated in FIG. 10 may be different from the embodiment of the battery module 100 illustrated in FIG. 2, where a thermal propagation blocking member 115 may be installed in a cell stack 110, and a venting member 155 may be disposed on one side of a flow space SF. In addition, a modified example illustrated in FIG. 11 may be different from the embodiment of the battery module 100 illustrated in FIG. 2, where a thermal propagation blocking member 115 may be installed in a cell stack 110. Therefore, a configuration of the battery module 100 described with reference to FIGS. 1 to 9 may be applied to the modified examples illustrated in FIGS. 10 and 11, with the above-described differences.

Therefore, to avoid unnecessary duplication, detailed descriptions of the modified examples illustrated in FIGS. 10 and 11 will be omitted, and may be replaced with the descriptions with reference to FIGS. 1 to 9. In addition, with respect to the modified examples illustrated in FIGS. 10 and 11, the same reference numerals may be assigned to the same or corresponding components as the embodiments illustrated in FIGS. 1 to 9, and only differences will be described.

The modified examples of FIGS. 10 and 11 may have a configuration in which the thermal propagation blocking member 115 is disposed between battery cells 120. The thermal propagation blocking member 115 may be disposed between the battery cells 120 to block propagation of at least one of heat or flames generated in one battery cell 120 to the other battery cell 120. The thermal propagation blocking member 115 may be formed as a planar structure. Such a thermal propagation blocking member 115 may be disposed between adjacent battery cells 120 as illustrated in FIG. 11, but may be installed between groups of battery cells 120 as illustrated in FIG. 10. For example, the thermal propagation blocking member 115 may be disposed between each group, in which each group includes two battery cells 120. In this case, the number of battery cells 120 partitioned by the thermal propagation blocking member 115 may be two or more. The number of battery cells 120 partitioned by the thermal propagation blocking member 115 may be set in consideration of an amount of heat generated by the battery cell 120, or performance, a thickness, or the like of the thermal propagation blocking member 115.

The thermal propagation blocking member 115 may be formed of a fire-resistant material and a heat-insulating material, to block heat/flame propagation between adjacent battery cells 120 or groups of battery cells 120. For example, the thermal propagation blocking member 115 may be formed of a material that may withstand high temperatures of 1000 degrees Celsius or higher without being ignited. The thermal propagation blocking member 115 may be configured to include at least a portion of mica, kaoline, aerogel, silicone, and ceramic, and, in addition, may include a known thermal stability blocking material such as various mineral fibers, a glass fiber, or the like.

In the modified example illustrated in FIG. 10, because the venting member 155 may be installed only on one side of the flow space SF in some examples, gas discharged from a battery cell 120 and moved to the flow space SF may be discharged onto an outside of a module housing 150 through the venting member 155 on the one side of the flow space SF.

Figure 12:
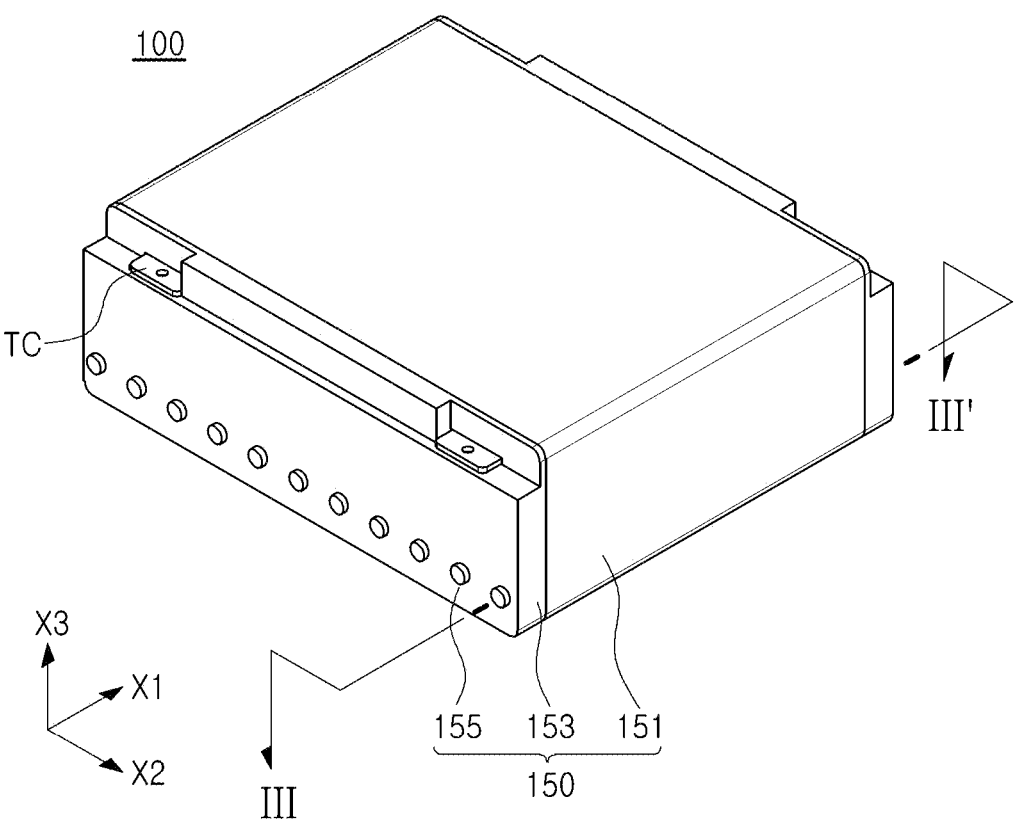
FIG. 12 is a perspective view of a battery module according to another embodiment of the present disclosure.
Figure 13:
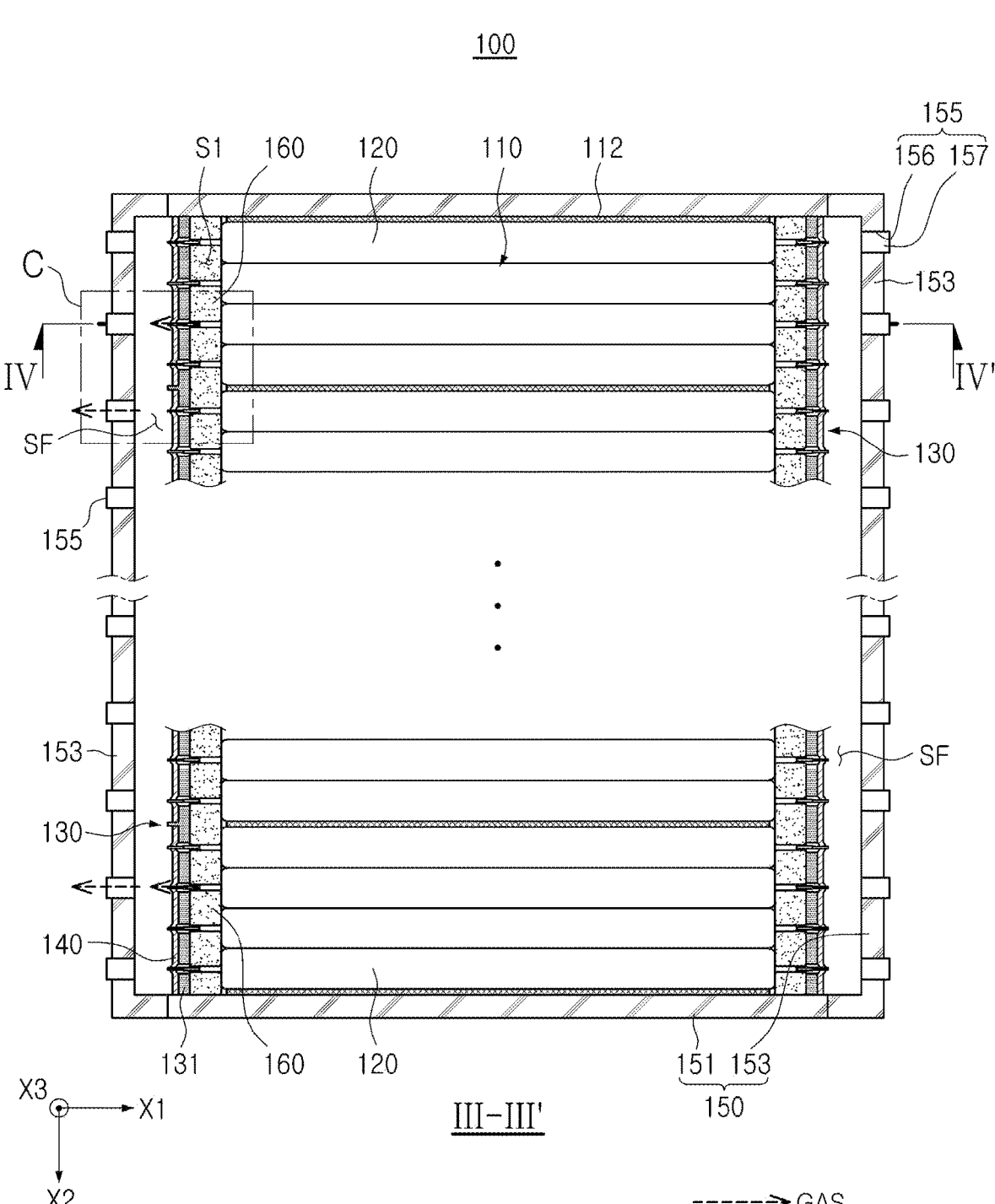
FIG. 13 is a cross-sectional view of FIG. 12, taken along line III-III'.
Figure 14:
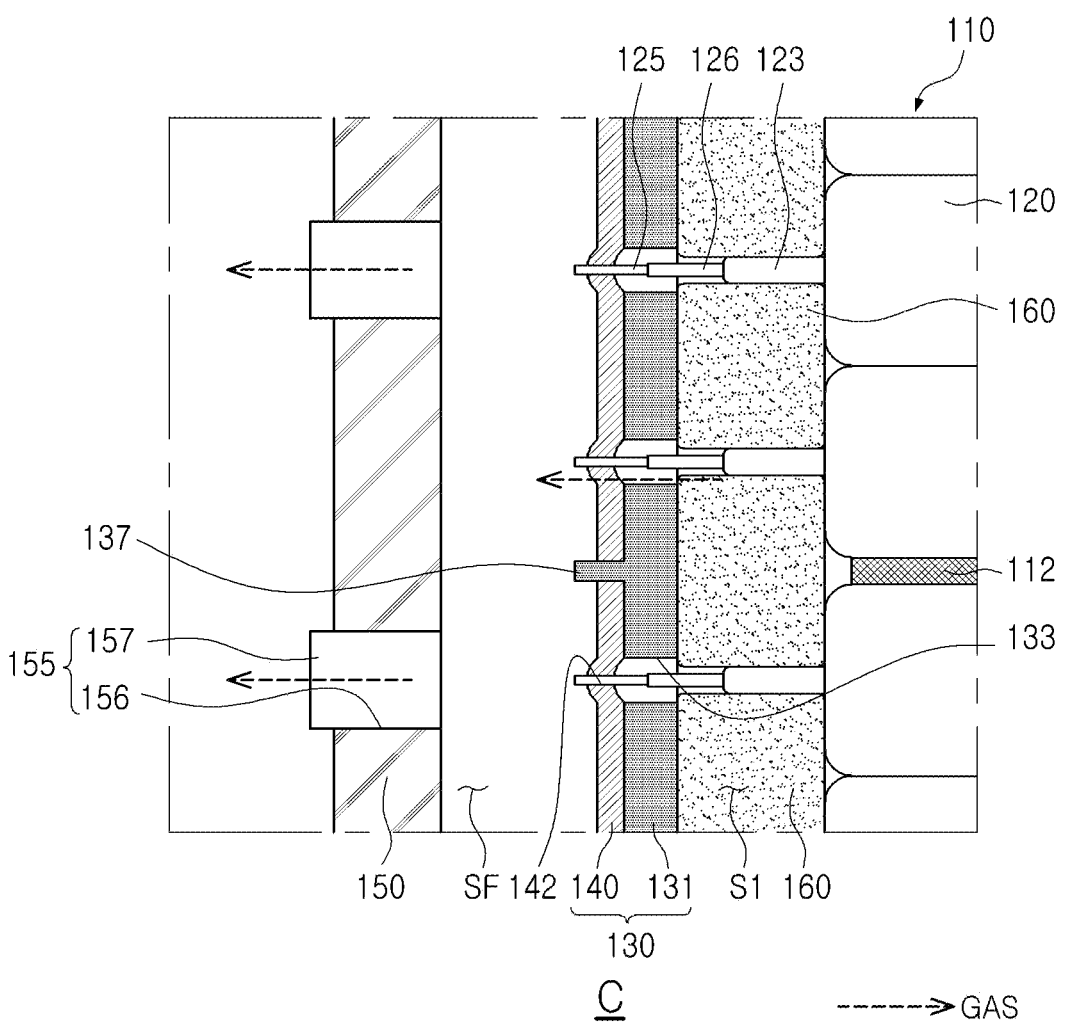
FIG. 14 is an enlarged view of portion C of FIG. 13.
Figure 15:
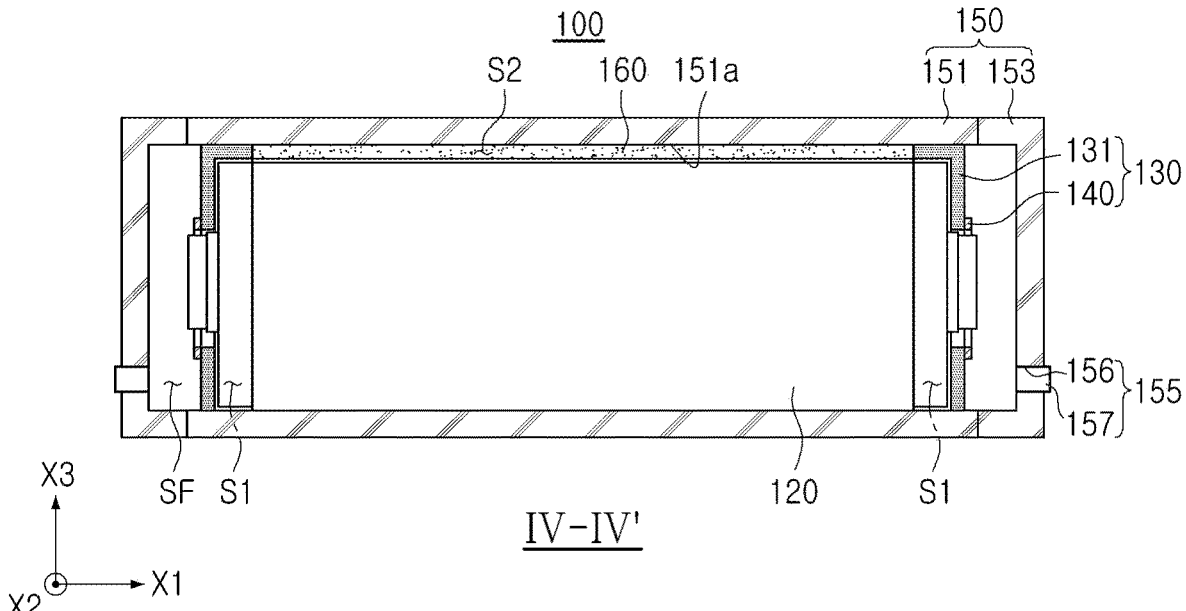
FIG. 15 is a cross-sectional view of FIG. 13, taken along line IV-IV'.

A battery module 100 according to another embodiment of the present disclosure will be described with reference to FIGS. 12 to 15. FIG. 12 is a perspective view of a battery module 100 according to another embodiment of the present disclosure, FIG. 13 is a cross-sectional view of FIG. 12, taken along line III-III', FIG. 14 is an enlarged view of portion C of FIG. 13, and FIG. 15 is a cross-sectional view of FIG. 13, taken along line IV-IV'.

A battery module 100 illustrated in FIGS. 12 to 15 may be different from the battery module 100 described with reference to FIGS. 1 to 9, where a venting member 155 may be provided on surfaces of a module housing 150, opposing a gas outlet HG.

A configuration of the battery module 100 described with reference to FIGS. 1 to 9 may be applied to the embodiment illustrated in FIGS. 12 to 15 except for the above-described differences. Therefore, to avoid unnecessary duplication, detailed descriptions of an embodiment illustrated in FIGS. 12 to 15 will be omitted, and may be replaced with the descriptions with reference to FIGS. 1 to 9. In addition, with respect to the embodiment illustrated in FIGS. 12 to 15, the same reference numerals may be assigned to the same or corresponding components to the embodiment illustrated in FIGS. 1 to 9, and only differences will be described.

Referring to FIG. 12, a venting member 155 may be provided on an end plate 153 corresponding to front and rear surfaces of a module housing 150. As illustrated in FIGS. 13 to 15, the venting member 155 may be provided on a surface of the module housing 150 opposing a gas outlet HG. Gas discharged through a sealing portion 123 adjacent to an electrode lead 125 of a battery cell 120 may be discharged into a flow space SF through a gas outlet HG installed in an extension direction of the electrode lead 125, and the gas discharged into the flow space SF may be discharged to an outside of the module housing 150 through the venting member 155 provided on the surface of the module housing 150, opposing the gas outlet HG. In this case, because the gas discharged into the flow space SF may be discharged through the venting member 155 adjacent to the gas outlet HG, the gas may be rapidly discharged. The venting member 155 may be provided on a height, corresponding to a height of the gas outlet HG for smooth gas discharge. In addition, the number and/or spacing of venting members 155 provided in the module housing 150 may be set in consideration of an exhaust pressure of the gas or the like.

Figure 16:
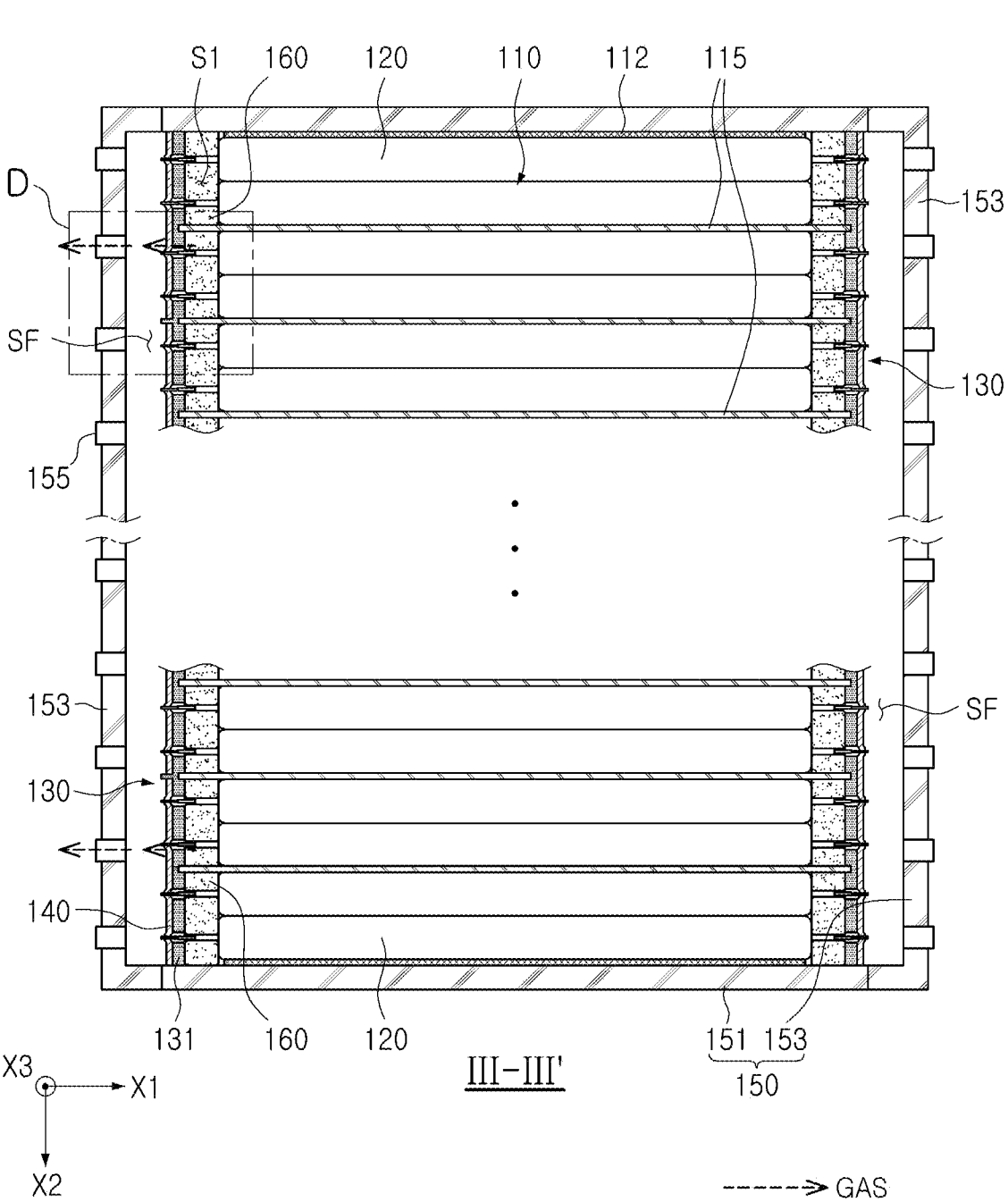
FIG. 16 is a cross-sectional view illustrating a modified example of the battery module illustrated in FIG. 13.

Next, a modified example of the battery module 100 illustrated in FIGS. 12 to 15 will be described with reference to FIGS. 16 and 17. FIG. 16 is a cross-sectional view illustrating a modified example of the battery module 100 illustrated in FIG. 13, and FIG. 17 is an enlarged view of portion D of FIG. 16.

Figure 17:
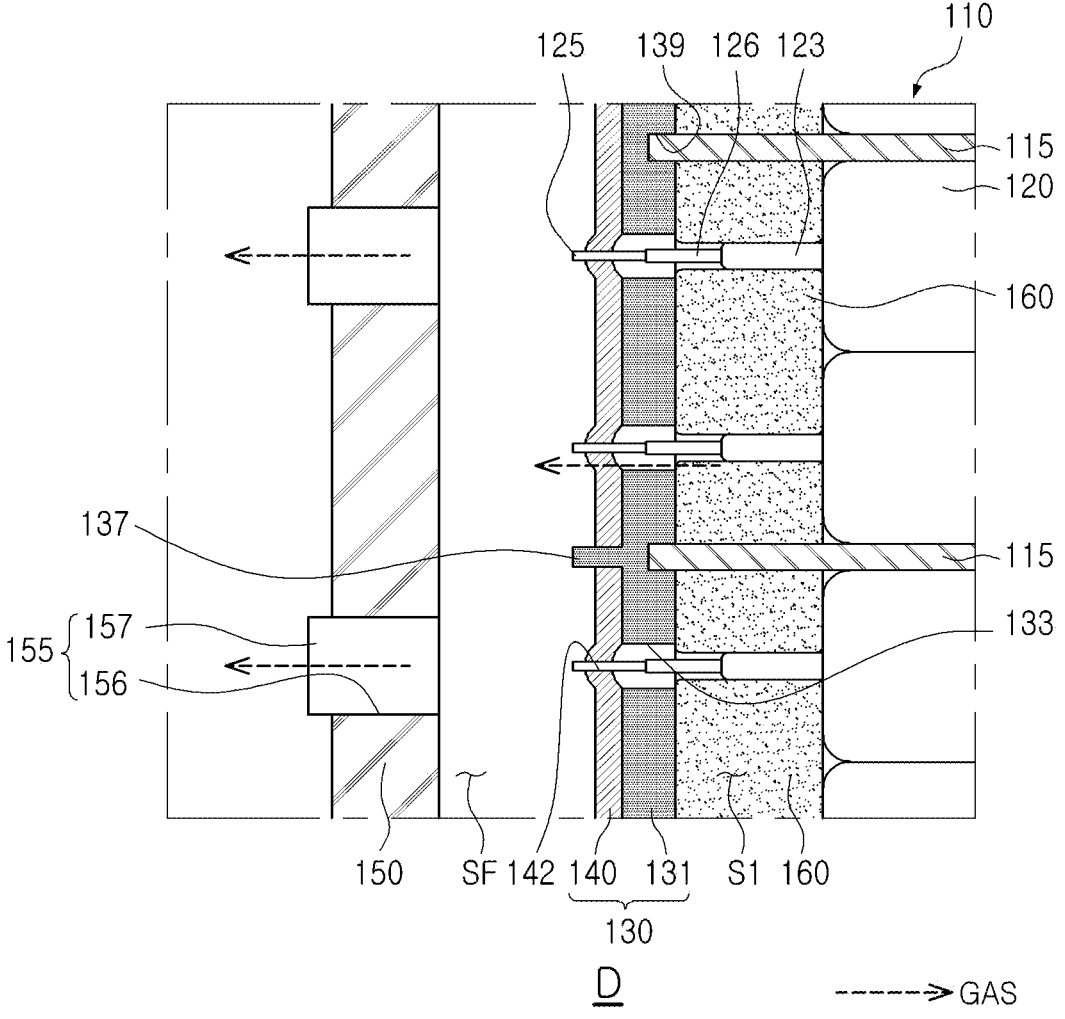
FIG. 17 is an enlarged view of portion D of FIG. 16.

A modified example illustrated in FIGS. 16 and 17 may be different from the embodiment of the battery module 100 illustrated in FIG. 13, where a thermal propagation blocking member 115 may be installed in a cell stack 110. Therefore, a configuration of the battery module 100 described with reference to FIGS. 12 to 15 may be applied to the modified example illustrated in FIGS. 16 and 17 except for the above-described differences. Therefore, to avoid unnecessary duplication, detailed descriptions of the modified example illustrated in FIGS. 16 and 17 will be omitted, and may be replaced with the descriptions with reference to FIGS. 12 to 15. In addition, with respect to the modified example illustrated in FIGS. 16 and 17, the same reference numerals may be assigned to the same or corresponding components as the embodiment illustrated in FIGS. 12 to 15, and only the differences will be described.

The modified example illustrated in FIGS. 16 and 17 may have a configuration in which the thermal propagation blocking member 115 is disposed between battery cells 120. The thermal propagation blocking member 115 may be disposed between the battery cells 120 to block propagation of at least one of heat or flame generated in one battery cell 120 to the other battery cell 120. The thermal propagation blocking member 115 may be formed of a planar structure. The thermal propagation blocking member 115 may be disposed between adjacent battery cells 120, but may also be installed between groups of battery cells 120 as illustrated in FIGS. 16 and 17. For example, the thermal propagation blocking member 115 may be disposed between each group, in which each group includes two battery cells 120. In this case, the number of battery cells 120 partitioned by the thermal propagation blocking member 115 may be two or more.

In addition, the thermal propagation blocking member 115 may be coupled to a busbar assembly 130 across a first space S1 formed between a cell stack 110 and an inner side surface of the busbar assembly 130. For example, the thermal propagation blocking member 115 may have a structure extending to a support plate 131 beyond a contact surface between battery cells 120. A coupling groove 139 to which the thermal propagation blocking member 115 is coupled may be formed in the support plate 131. As such, when the thermal propagation blocking member 115 is coupled to the support plate 131 across the first space S1, because the thermal propagation blocking member 115 may separate or block a space between adjacent battery cells 120 or groups of battery cells 120, heat/flame propagation through the first space S1 may be effectively blocked. For example, in the modified example of FIGS. 16 and 17, heat/flame propagation through the first space S1 may be blocked regardless of whether a filler 160 is installed in the first space S1.

The thermal propagation blocking member 115 may be formed of a fire-resistant material and a heat-insulating material, to block heat/flame propagation between adjacent battery cells 120 or groups of battery cells 120. For example, the thermal propagation blocking member 115 may be formed of a material that may withstand high temperatures of 1000 degrees Celsius or higher without being ignited. The thermal propagation blocking member 115 may be configured to include at least a portion of mica, kaoline, aerogel, silicone, and ceramic, and, in addition, may include a known thermal stability blocking material such as various mineral fibers, a glass fiber, or the like.

Figure 18:
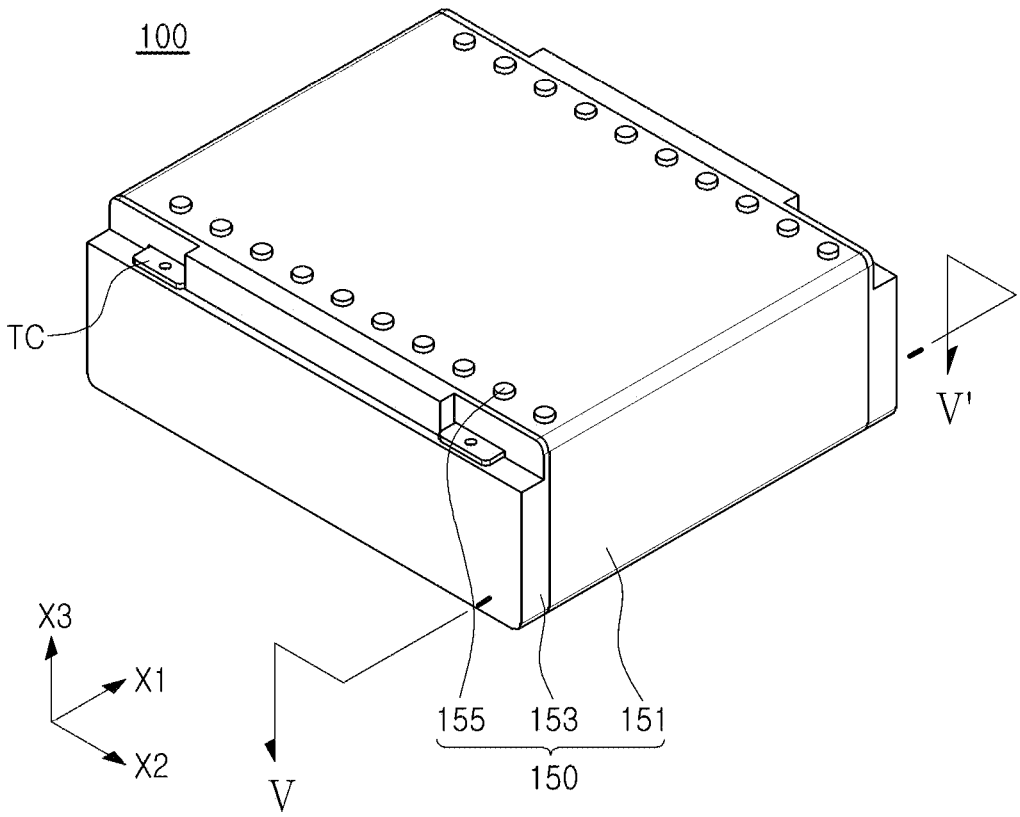
FIG. 18 is a perspective view of a battery module according to another embodiment of the present disclosure.

Another embodiment of a battery module 100 is described with reference to FIGS. 18 to 20. FIG. 18 is a perspective view of a battery module 100 according to another embodiment of the present disclosure, FIG. 19 is a cross-sectional view of FIG. 18, taken along line V-V', and FIG. 20 is a cross-sectional view of FIG. 19, taken along line VI-VI'.

In this example, a venting member 155 may be provided on an upper surface of a module housing 150. Gas discharged from a battery cell 120 and flowing through a flow space SF may be discharged through the venting member 155 on the upper surface of the module housing 150. An installation position of the venting member 155 is not limited to the upper surface of the module housing 150, and may be further provided on at least some of a side surface (see FIG. 1) or front and rear surfaces (see FIG. 12) of the module housing 150.

Figure 19:
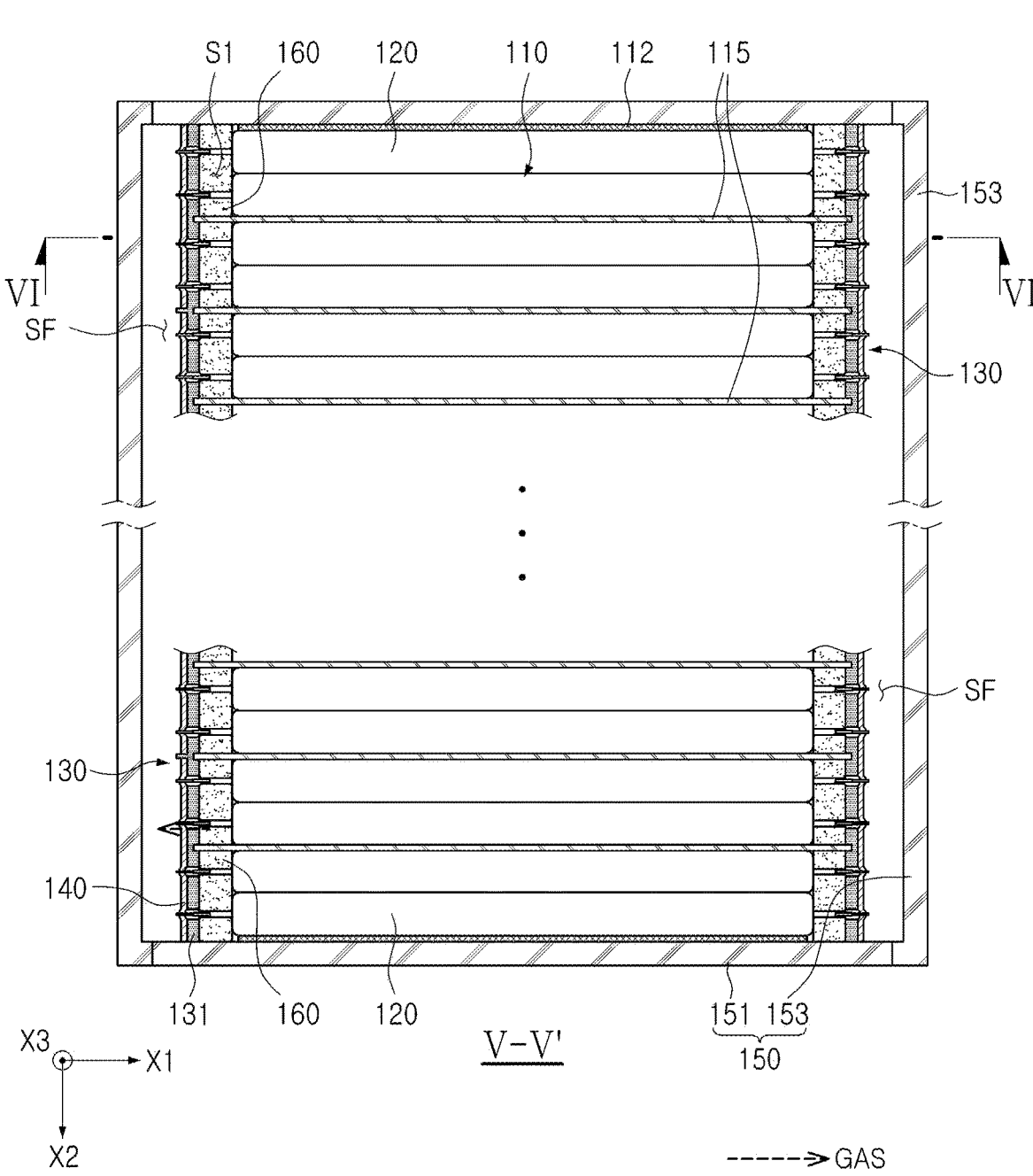
FIG. 19 is a cross-sectional view of FIG. 18, taken along line V-V'.

In the battery module 100 illustrated in FIG. 19, a thermal propagation blocking member 115 may be installed between battery cells 120, similar to the embodiment illustrated in FIGS. 16 and 17. A structure of the battery module 100 illustrated in FIG. 19 may be the same as that of the battery module 100 illustrated in FIGS. 16 and 17, except for a position of the venting member 155. Therefore, to avoid unnecessary duplication, detailed descriptions of configurations of the thermal propagation blocking member 115 and its installation structure will be omitted, and may be replaced with the above description.

Figure 20:
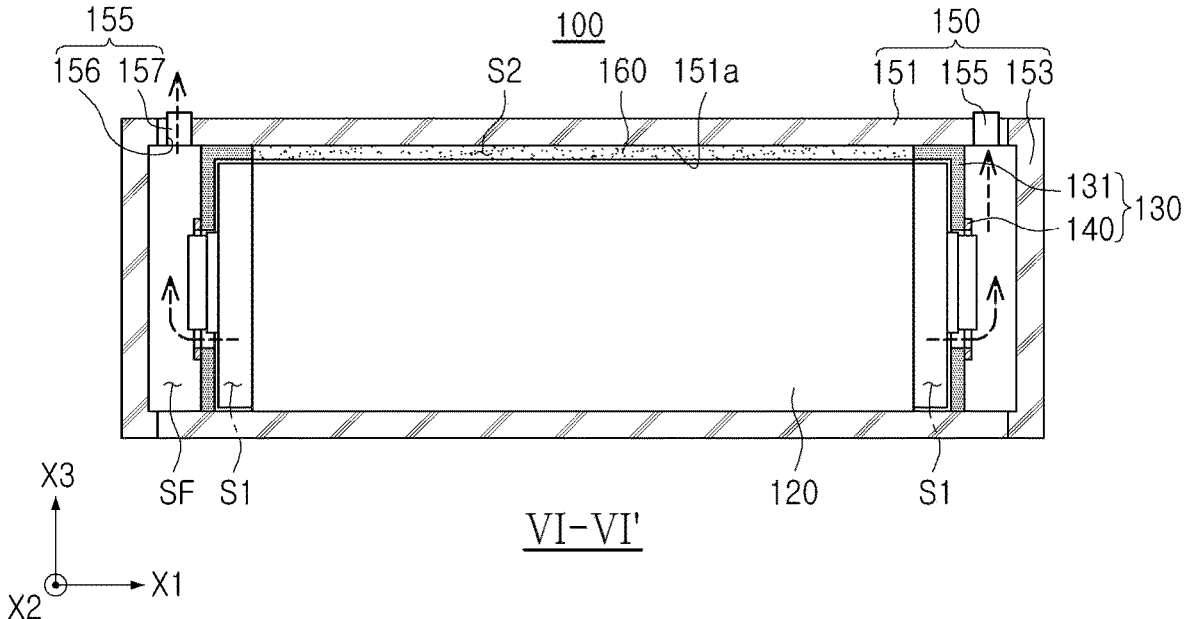
FIG. 20 is a cross-sectional view of FIG. 19, taken along line VI-VI'.

Referring to FIG. 20, gas discharged from the battery cell 120 may be moved to the flow space SF, and may be then discharged externally through a venting member 155 located in an upper portion of the flow space SF.

According to an embodiment of the present disclosure having such a configuration, an effect minimizing a thermal propagation phenomenon by inducing rapid discharging of gas generated within a battery cell externally may be obtained.

In addition, according to an embodiment of the present disclosure, an effect having a structure for inducing rapid discharging of gas from a portion in which an electrode lead of a battery cell is disposed to an outside of a module housing may be obtained.

And, according to an embodiment of the present disclosure, an effect minimizing thermal propagation between adjacent battery cells may be obtained.

While example embodiments have been illustrated and described above, it will be apparent to those skilled in the art that modifications and variations could be made without departing from the scope of the present disclosure as defined by the appended claims.

For example, it may be implemented by deleting some components in the above-described embodiments, and each of the embodiments and modified examples may be implemented in combination with each other.

What is claimed is:

1. A battery module comprising:
a module housing configured to hold a cell stack comprising a plurality of battery cells, each of the plurality of battery cells including an electrode accommodating portion accommodating an electrode assembly therein, a sealing portion sealing at least a portion of a circumference of the electrode accommodating portion, and electrode leads electrically connected to the electrode assembly;
a busbar assembly having an electrically conductive busbar configured for electrical connection to the electrode leads of the battery cells; and
a filler covering at least a portion of the cell stack,
wherein the busbar assembly comprises a gas outlet configured for discharging gas generated within the plurality of battery cells in a direction away from the cell stack,
wherein the module housing comprises a venting member configured to vent the gas discharged from the gas outlet to an outside of the module housing,
wherein the filler fills a space between an inner side surface of the busbar assembly and the electrode accommodating portion of the plurality of battery cells provided to the cell stack in at least a part of a cross section perpendicular to a height direction of the plurality of battery cells,
in the space, the filler is in contact with the inner side surface of the busbar assembly, the electrode accommodating portion of the plurality of battery cells, and the sealing portion of battery cells adjacent to each other, respectively,
the gas outlet comprises a busbar outlet formed in the busbar,
the busbar further comprises a coupling hole structured to couple a first electrode lead with the busbar,
the busbar outlet has a shape having a width, wider than a width of the coupling hole in a width direction in which the plurality of battery cells are arranged, and
the busbar outlet and the coupling hole are disposed at different heights in a height direction of the plurality of battery cells, respectively, the height direction being a direction in which the coupling hole having a slit shape is extended.

2. The battery module of claim 1, wherein a flow space in which the gas discharged from the gas outlet flows is formed between an outer side surface of the busbar assembly and an inner side surface of the module housing, and
the venting member is provided in a position corresponding to the flow space in the module housing.

3. The battery module of claim 2, wherein the flow space extends on a first plane, perpendicular to a longitudinal direction of each of the plurality of battery cells, and
the venting member is provided on one or both sides of the flow space in the module housing, based on an extending direction of the flow space.

4. The battery module of claim 2, wherein the venting member is provided on a surface of the module housing opposing the gas outlet.

5. The battery module of claim 1, wherein the busbar assembly further comprises an insulating support plate on which the busbar is installed,
the gas outlet is formed to pass through at least one of the support plate and the busbar.

6. The battery module of claim 5, wherein the gas outlet further comprises an insulator outlet formed in the support plate, and the busbar outlet communicates with the insulator outlet.

7. The battery module of claim 6, wherein a through-hole configured for a first electrode lead to pass is formed in the support plate to couple the first electrode lead to the busbar,
wherein the insulator outlet is integrally formed with the through-hole.

8. The battery module of claim 1, wherein the busbar outlet is integrally formed with the coupling hole.

9. The battery module of claim 1, wherein the filler is accommodated in at least a portion of a first space formed between the cell stack and the inner side surface of the busbar assembly.

10. The battery module of claim 9, wherein electrode leads are located on both end portions of each of the plurality of battery cells in a longitudinal direction of each of the plurality of battery cells,
wherein the busbar assembly is configured for coupling to the electrode leads on both end portions of each of the plurality of battery cells in the longitudinal direction, and
the first space is located on both sides of the plurality of battery cells in the longitudinal direction.

11. The battery module of claim 1, wherein the filler is accommodated in at least a portion of a second space formed between an upper side of the cell stack and an inner side surface of the module housing opposing the upper side of the cell stack.

12. The battery module of claim 1, wherein the filler is formed of a material having a heat resistant temperature of 100 degrees or more, or
wherein the filler comprises at least a portion of ceramic, graphite, alumina, or a heat-resistant plastic.

13. The battery module of claim 1, wherein the cell stack comprises a thermal propagation blocking member blocking diffusion of at least one of heat or flame between the plurality of battery cells.

14. The battery module of claim 13, wherein the thermal propagation blocking member is formed of a fire-resistant material and a heat-insulating material, or
wherein the thermal propagation blocking member comprises at least a portion of mica, kaolin, aerogel, silicone, or ceramic.

15. The battery module of claim 13, wherein the thermal propagation blocking member crosses a first space formed between the cell stack and the inner side surface of the busbar assembly, to be coupled to the busbar assembly.

16. The battery module of claim 1, wherein the venting member comprises a venting hole formed in the module housing.

17. The battery module of claim 1, wherein the venting member comprises a venting hole formed in the module housing, and a venting unit installed in the venting hole, and
wherein the venting member has a structure that is configured to be opened when gas is discharged.

18. The battery module of claim 1, wherein each of the plurality of battery cells is formed of a pouch-type secondary battery.

* * * * *